United States Patent
Nakano et al.

(10) Patent No.: US 10,895,002 B2
(45) Date of Patent: *Jan. 19, 2021

(54) STEEL SHEET

(71) Applicant: NIPPON STEEL & SUMITOMO METAL CORPORATION, Tokyo (JP)

(72) Inventors: Katsuya Nakano, Tokyo (JP); Kunio Hayashi, Tokyo (JP); Yuri Toda, Tokyo (JP); Eisaku Sakurada, Tokyo (JP); Akihiro Uenishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/334,950

(22) PCT Filed: Jan. 30, 2017

(86) PCT No.: PCT/JP2017/003109
§ 371 (c)(1),
(2) Date: Mar. 20, 2019

(87) PCT Pub. No.: WO2018/138898
PCT Pub. Date: Aug. 2, 2018

(65) Prior Publication Data
US 2020/0024706 A1    Jan. 23, 2020

(51) Int. Cl.
| | | |
|---|---|---|
| *C22C 38/04* | (2006.01) | |
| *C22C 38/02* | (2006.01) | |
| *C22C 38/06* | (2006.01) | |
| *C22C 38/12* | (2006.01) | |
| *C22C 38/14* | (2006.01) | |
| *C22C 38/16* | (2006.01) | |
| *C22C 38/54* | (2006.01) | |
| *C23C 2/04* | (2006.01) | |
| *C22C 38/00* | (2006.01) | |
| *C21D 8/02* | (2006.01) | |

(52) U.S. Cl.
CPC .......... *C22C 38/04* (2013.01); *C22C 38/001* (2013.01); *C22C 38/02* (2013.01); *C22C 38/06* (2013.01); *C22C 38/12* (2013.01); *C22C 38/14* (2013.01); *C22C 38/16* (2013.01); *C22C 38/54* (2013.01); *C23C 2/04* (2013.01); *C21D 8/0226* (2013.01); *C21D 8/0236* (2013.01); *C21D 8/0273* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
USPC ...................................................... 148/320
See application file for complete search history.

(56) References Cited

U.S. PATENT DOCUMENTS

| | | | |
|---|---|---|---|
| 2007/0193666 A1* | 8/2007 | Asahi | ............... B32B 15/01 148/654 |
| 2014/0056753 A1 | 2/2014 | Naitou et al. | |
| 2014/0170440 A1 | 6/2014 | Kawata et al. | |
| 2014/0234657 A1 | 8/2014 | Azuma et al. | |
| 2014/0242416 A1 | 8/2014 | Matsuda et al. | |
| 2017/0313028 A1 | 11/2017 | Kawata et al. | |
| 2017/0314116 A1 | 11/2017 | Kawata et al. | |

FOREIGN PATENT DOCUMENTS

| | | |
|---|---|---|
| CN | 105734410 A | 7/2016 |
| EP | 3085802 A1 | 10/2016 |
| JP | 7-11383 A | 1/1995 |
| JP | 7-74412 B2 | 8/1995 |
| JP | 10-130776 A | 5/1998 |
| JP | 2010-43360 A | 5/1998 |
| JP | 2007-9317 A | 1/2007 |
| JP | 2007-70649 A | 3/2007 |
| JP | 2007-70659 A | 3/2007 |
| JP | 2011-111675 A | 6/2011 |
| JP | 2011-144409 A | 7/2011 |
| JP | 2015-78398 A | 4/2015 |
| WO | WO 2013/047820 A1 | 4/2013 |
| WO | WO 2016/072477 A1 | 5/2016 |
| WO | WO 2016/072479 A | 5/2016 |

OTHER PUBLICATIONS

Davis, Joseph. "Dip, Barrier, and Chemical Conversion Coatings." Metals Handbook Desk Edition (2nd edition). ASM International. pp. 1154-1165. 1998. (Year: 1998).*
International Search Report for PCT/JP2017/003109 dated Apr. 25, 2017.
Kitajima et al., "Characterization methods of complex ferritic microstructures using Electron Channeling Contrast Image", CAMP-ISIJ, 2013, vol. 26, No. 2, p. 896, total 2 pages.
Written Opinion of the International Searching Authority for PCT/JP2017/003109 (PCT/ISA/237) dated Apr. 25, 2017.
International Preliminary Report on Patentability and English translation of the Written Opinion of the International Searching Authority for International Application No. PCT/JP2017/003109, dated Aug. 8, 2019.
Extended European Search Report, dated Apr. 17, 2020, for corresponding European Application No. 17894095.3.

* cited by examiner

*Primary Examiner* — Brian D Walck
(74) *Attorney, Agent, or Firm* — Birch, Stewart, Kolasch & Birch, LLP

(57) ABSTRACT

A steel sheet includes a predetermined chemical composition and a metal structure represented by, in area fraction, ferrite: 30% to 50%, granular bainite: 5% to 20%, martensite: 30% to 55%, bainite: less than 35%, and retained austenite and pearlite: 10% or less in total. Preferably, of the steel sheet, a tensile strength is 1180 MPa or more, elongation is 10% or more, and a hole expansion value is 20% or more. Further preferably, a VDA bending angle in the case where a thickness is set to t (mm) is "$7.69t^2-38.4t+109$" or more.

12 Claims, No Drawings

STEEL SHEET

TECHNICAL FIELD

The present invention relates to a steel sheet suitable for automotive parts.

BACKGROUND ART

In order to suppress the emission of carbon dioxide gas from an automobile, a reduction in weight of an automotive vehicle body using a high-strength steel sheet has been in progress. Further, in order also to secure the safety of a passenger, the high-strength steel sheet has come to be often used for the vehicle body. In order to promote a further reduction in weight of the vehicle body, a further improvement in strength is important. On the other hand, some parts of the vehicle body are required to have excellent formability. For example, a high-strength steel sheet for framework system parts is required to have excellent elongation and hole expandability.

However, it is difficult to achieve both the improvement in strength and the improvement in formability.

For example, Patent Literature 1 describes that the distribution of nanohardness of a steel sheet composed of ferrite and martensite is controlled in order to achieve both strength and workability. Patent Literature 1 also describes that a side bend test simulating stretch flange forming is performed when evaluating the workability. However, there is no description about bendability.

The steel sheet described in Patent Literature 2 has a martensite structure as a main phase and is excellent in strength and bendability, but is poor in ductility, and thus cracking may occur at the time of forming.

As the steel sheet excellent in ductility, for example, there exists a TRIP (Transformation Induced Plasticity) steel containing retained austenite described in Patent Literature 3. In the TRIP steel, retained austenite existing in the steel is transformed into martensite at the time of forming, and thereby excellent ductility can be obtained. However, the martensite obtained by the transformation from the retained austenite at the time of forming is hard and is likely to be a starting point of cracking to thus cause deterioration in hole expandability or bendability.

CITATION LIST

Patent Literature

Patent Literature 1: Japanese Laid-open Patent Publication No. 2011-144409
Patent Literature 2: Japanese Examined Patent Application Publication No. 7-74412
Patent Literature 3: Japanese Laid-open Patent Publication No. 10-130776

SUMMARY OF INVENTION

Technical Problem

An object of the present invention is to provide a steel sheet having a high strength and capable of obtaining excellent elongation and hole expandability.

Solution to Problem

The present inventors conducted earnest examinations in order to solve the above-described problems. As a result, they found out that it is important to set the area fraction of ferrite to 30% to 50, set the area fraction of martensite to 30% to 55%, set the area fraction of granular bainite to 5% to 20%, set the area fraction of bainite to less than 35%, and set the total area fraction of retained austenite and pearlite to 10% or less. The martensite includes tempered martensite. The granular bainite is mainly composed of bainitic ferrite whose dislocation density is low and hardly contains hard cementite, and thus is harder than ferrite and softer than bainite and martensite. Thus, the granular bainite exhibits more excellent elongation than the bainite and the martensite. Further, the granular bainite is harder than ferrite and softer than bainite and martensite, to thus suppress that voids occur from an interface between ferrite and martensite or bainite at the time of hole expanding.

The inventor of the present application further conducted earnest examinations repeatedly based on such findings, and then conceived the following various aspects of the invention consequently.

(1) A steel sheet includes:
a chemical composition represented by, in mass %,
C: 0.09% to 0.15%,
Si: 0.2% to 2.5%,
Al: 0.01% to 1.00%,
Mn: 1.0% to 3.0%,
P: 0.02% or less,
S: 0.01% or less,
N: 0.007% or less,
O: 0.006% or less,
Cr: 0.00% to 1.00%,
Mo: 0.00% to 1.00%,
B: 0.0000% to 0.010%,
Nb: 0.000% to 0.30%,
Ti: 0.000% to 0.30%,
Ni: 0.00% to 1.00%,
Cu: 0.00% to 1.00%,
V: 0.000% to 0.50%,
Mg: 0.0000% to 0.04%,
REM: 0.0000% to 0.04%, and
the balance: Fe and impurities; and
a metal structure represented by, in area fraction,
ferrite: 30% to 50%,
granular bainite: 5% to 20%,
martensite: 30% to 55%,
bainite: less than 35%, and
retained austenite and pearlite: 10% or less in total.

(2) The steel sheet according to (1), in which a tensile strength is 1180 MPa or more, elongation is 10% or more, and a hole expansion value is 20% or more.

(3) The steel sheet according to (1) or (2), in which a VDA bending angle in the case where a thickness is set to t (mm) is "$7.69t^2 - 38.4t + 109$" or more.

(4) The steel sheet according to any one of (1) to (3), further includes:
a hot-dip galvanizing layer on a surface thereof.

(5) The steel sheet according to any one of (1) to (3), further includes:
an alloyed hot-dip galvanizing layer on a surface thereof.

Advantageous Effects of Invention

According to the present invention, granular bainite, and the like are contained in a metal structure with appropriate area fractions, so that it is possible to obtain a high strength and excellent elongation and hole expandability.

DESCRIPTION OF EMBODIMENTS

There will be explained an embodiment of the present invention below.

First, there will be explained a metal structure of a steel sheet according to the embodiment of the present invention. Although details will be described later, the steel sheet according to the embodiment of the present invention is manufactured by undergoing hot rolling, cold rolling, annealing, tempering, and so on of a steel. Thus, the metal structure of the steel sheet is one in which not only properties of the steel sheet but also phase transformations by these treatments and so on are considered. The steel sheet according to this embodiment includes a metal structure represented by, in area fraction, ferrite: 30% to 50%, granular bainite: 5% to 20%, martensite: 30% to 55%, bainite: less than 35%, and retained austenite and pearlite: 10% or less in total.

(Ferrite: 30% to 50%)

Ferrite is a soft structure, and thus is deformed easily and contributes to an improvement in elongation. Ferrite contributes also to a phase transformation to granular bainite from austenite. When the area fraction of the ferrite is less than 30%, it is impossible to obtain sufficient elongation. Further, it is impossible to obtain an appropriate area fraction of granular bainite. Thus, the area fraction of the ferrite is set to 30% or more and preferably set to 35% or more. On the other hand, when the area fraction of the ferrite is greater than 50%, it is difficult to obtain a tensile strength of 1180 MPa or more. Thus, the area fraction of the ferrite is set to 50% or less and preferably set to 45% or less.

(Granular bainite: 5% to 20%)

Granular bainite is mainly composed of bainitic ferrite whose dislocation density is as low as the order of about $10^{13}$ m/m$^3$ and hardly contains hard cementite, and thus is harder than ferrite and softer than bainite. Thus, the granular bainite exhibits more excellent elongation than bainite. The granular bainite is harder than ferrite and softer than bainite and martensite, and thus suppresses that voids occur from an interface between ferrite and martensite and voids occur from an interface between ferrite and bainite at the time of hole expanding. When the area fraction of the granular bainite is less than 5%, it is impossible to sufficiently obtain these effects. Thus, the area fraction of the granular bainite is set to 5% or more and preferably set to 10% or more. On the other hand, when the area fraction of the granular bainite is greater than 20%, it is impossible to sufficiently obtain martensite, resulting in difficulty in obtaining a tensile strength of 1180 MPa or more. Thus, the area fraction of the granular bainite is set to 20% or less and preferably set to 15% or less.

(Martensite: 30% to 55%)

Martensite has a high dislocation density and is a hard structure, and thus contributes to an improvement in tensile strength. When the area fraction of the martensite is less than 30%, it is impossible to obtain a tensile strength of 1180 MPa or more. Thus, the area fraction of the martensite is set to 30% or more and preferably set to 35% or more. On the other hand, when the area fraction of the martensite is greater than 55%, it is impossible to obtain sufficient elongation. Thus, the area fraction of the martensite is set to 55% or less and preferably set to 50% or less. As-quenched martensite and tempered martensite belong to martensite. That is, the area fraction of the martensite is the total of the area fraction of as-quenched martensite and the area fraction of tempered martensite. The method of obtaining the tempered martensite is not limited, and the tempered martensite can be obtained by self-tempering during cooling, or can also be obtained by a tempering heat treatment after continuous annealing.

(Bainite: less than 35%)

Bainite is composed of bainitic ferrite whose dislocation density is as high as about $1.0 \times 10^{14}$ m/m$^3$ and hard cementite mainly and contributes to an improvement in tensile strength. However, when the area fraction of the bainite is 35% or more, the area fraction of martensite, which contributes to an improvement in tensile strength rather than bainite, goes short, resulting in difficulty in obtaining a tensile strength of 1180 MPa or more. Thus, the area fraction of the bainite is set to less than 35%.

(Retained Austenite and Pearlite: 10% or Less in Total)

Retained austenite is transformed into martensite by strain-induced transformation during deformation, bringing about excellent work hardening and high uniform elongation. However, the strain-induced transformed martensite impairs hole expandability significantly. Pearlite contains hard cementite, to thus be a starting point from which voids occur at the time of hole expanding to impair hole expandability. When the total area fraction of the retained austenite and the pearlite is greater than 10% in particular, the impairment of hole expandability is prominent. Thus, the total area fraction of the retained austenite and the pearlite is set to 10% or less.

Identifications of the ferrite, the granular bainite, the martensite, the bainite, the retained austenite, and the pearlite and determinations of the area fractions of them can be performed by, for example, an electron back scattering diffraction (EBSD) method, an X-ray measurement, or a scanning electron microscope (SEM) observation. In the case where the SEM observation is performed, for example, a nital reagent or a LePera reagent is used to corrode a sample and a cross section parallel to a rolling direction and a thickness direction and/or a cross section vertical to the rolling direction are/is observed at 1000-fold to 50000-fold magnification. A metal structure in a region at about a ¼ thickness of the steel sheet as the depth from the surface can represent the metal structure of the steel sheet. In the case of the thickness of the steel sheet being 1.2 mm, for example, a metal structure in a region at a depth of about 0.3 mm from the surface can represent the metal structure of the steel sheet.

The area fraction of the ferrite can be determined by using an electron channeling contrast image to be obtained by the SEM observation, for example. The electron channeling contrast image expresses a crystal misorientation in a crystal grain as a contrast difference, and in the electron channeling contrast image, a portion with a uniform contrast is the ferrite. In this method, for example, a region having a ⅛ to ⅜ thickness of the steel sheet as the depth from the surface is set as an object to be observed.

The area fraction of the retained austenite can be determined by the X-ray measurement, for example. In this method, for example, a portion of the steel sheet from the surface to a ¼ thickness of the steel sheet is removed by mechanical polishing and chemical polishing, and as characteristic X-rays, MoKa rays are used. Then, from an integrated intensity ratio of diffraction peaks of (200) and (211) of a body-centered cubic lattice (bcc) phase and (200), (220), and (311) of a face-centered cubic lattice (fcc) phase, the area fraction of the retained austenite is calculated by using the following equation.

$$S\gamma = (I_{200f} + I_{220f} + I_{311f})/(I_{200b} + I_{211b}) \times 100$$

(Sγ indicates the area fraction of the retained austenite, $I_{200f}$, $I_{220f}$, and $I_{311f}$ indicate intensities of the diffraction peaks of (200), (220), and (311) of the fcc phase respectively, and $I_{200b}$ and $I_{211b}$ indicate intensities of the diffraction peaks of (200) and (211) of the bcc phase respectively.)

The area fraction of the as-quenched martensite can be determined by a field emission-scanning electron microscope (FE-SEM) observation and the X-ray measurement, for example. In this method, for example, a region having a ⅛ to ⅜ thickness of the steel sheet as the depth from the surface of the steel sheet is set as an object to be observed and a LePera reagent is used for corrosion. Since the structure that is not corroded by the LePera reagent is as-quenched martensite and retained austenite, it is possible to determine the area fraction of the as-quenched martensite by subtracting the area fraction Sγ of the retained austenite determined by the X-ray measurement from an area fraction of a region that is not corroded by the LePera reagent. The area fraction of the as-quenched martensite can also be determined by using the electron channeling contrast image to be obtained by the SEM observation, for example. In the electron channeling contrast image, a region that has a high dislocation density and has a substructure such as a block or packet in a grain is the as-quenched martensite. The area fraction of the tempered martensite can be determined by the FE-SEM observation, for example. In this method, for example, a region having a ⅛ to ⅜ thickness of the steel sheet as the depth from the surface of the steel sheet is set as an object to be observed and a nital reagent is used for corrosion. Then, as described below, the tempered martensite is identified based on the position of cementite and variants. The tempered martensite contains cementite inside a martensite lath. The cementite contained in the tempered martensite has a plurality of variants because there are two or more types of crystal orientation relationship between the martensite lath and the cementite. The tempered martensite can be identified based on the position of cementite and the variants as above to determine its area fraction.

The bainite can be identified by the FE-SEM observation, for example. In this method, for example, a region having a ⅛ to ⅜ thickness of the steel sheet as the depth from the surface of the steel sheet is set as an object to be observed and a nital reagent is used for corrosion. Then, as described below, the bainite is identified based on the position of cementite and variants. The bainite includes upper bainite and lower bainite. The upper bainite contains cementite or retained austenite at an interface of lath-shaped bainitic ferrite. The lower bainite contains cementite inside the lath-shaped bainitic ferrite. The cementite contained in the lower bainite has the same variant because there is one type of crystal orientation relationship between the bainitic ferrite and the cementite. The bainite can be identified based on the position of cementite and the variant as above to determine its area fraction.

The pearlite can be identified by an optical microscope observation, for example, to determine its area fraction. In this method, for example, a region having a ⅛ to ⅜ thickness of the steel sheet as the depth from the surface of the steel sheet is set as an object to be observed and a nital reagent is used for corrosion. The region exhibiting a dark contrast by the optical microscope observation is the pearlite.

It is difficult to distinguish the granular bainite from ferrite not only by the conventional corrosion method but also by the secondary electron image observation using a scanning electron microscope. As a result of an earnest examination, the present inventors found out that the granular bainite has a tiny crystal misorientation in a grain. Thus, detecting a tiny crystal misorientation in a grain makes it possible to distinguish the granular bainite from ferrite. Here, there will be explained a concrete method of determining the area fraction of the granular bainite. In this method, a region having a ⅛ to ⅜ thickness of the steel sheet as the depth from the surface of the steel sheet is set as an object to be measured, by the EBSD method, a crystal orientation of a plurality of places (pixels) in this region is measured at 0.2-μm intervals, and a value of a GAM (grain average misorientation) is calculated from this result. In the event of this calculation, it is set that in the case where the crystal misorientation between adjacent pixels is 5° or more, a grain boundary exists between them, and the crystal misorientation between adjacent pixels is calculated in a region surrounded by this grain boundary to find an average value of the crystal misorientations. This average value is the value of GAM. In this manner, it is possible to detect the tiny crystal misorientation of the bainitic ferrite. The region with the value of GAM being 0.5° or more belongs to one of the granular bainite, the bainite, the tempered martensite, the pearlite, and the martensite. Thus, the value obtained by subtracting the total of the area fractions of the bainite, the tempered martensite, the pearlite, and the martensite from the area fraction of the region with the value of GAM being 0.5° or more is the area fraction of the granular bainite.

Next, there will be explained a chemical composition of the steel sheet according to the embodiment of the present invention and a slab to be used for manufacturing the steel sheet. As described above, the steel sheet according to the embodiment of the present invention is manufactured by undergoing hot rolling, cold rolling, annealing, and so on of the slab. Thus, the chemical composition of the steel sheet and the slab is one in which not only properties of the steel sheet but also these treatments are considered. In the following explanation, "%" being the unit of a content of each element contained in the steel sheet and the slab means "mass %" unless otherwise stated. The steel sheet according to this embodiment includes a chemical composition represented by, in mass %, C: 0.09% to 0.15%, Si: 0.2% to 2.5%, Al: 0.01% to 1.00%, Mn: 1.0% to 3.0%, P: 0.02% or less, S: 0.01% or less, N: 0.007% or less, O: 0.006% or less, Cr: 0.00% to 1.00%, Mo: 0.00% to 1.00%, B: 0.0000% to 0.010%, Nb: 0.000% to 0.30%, Ti: 0.000% to 0.30%, Ni: 0.00% to 1.00%, Cu: 0.00% to 1.00%, V: 0.000% to 0.50%, Mg: 0.0000% to 0.04%, REM: 0.0000% to 0.04%, and the balance: Fe and impurities. Examples of the impurities include ones contained in raw materials such as ore and scrap and ones contained in manufacturing steps.

(C: 0.09% to 0.15%)

C contributes to an improvement in tensile strength. When the C content is less than 0.09%, it is difficult to obtain a tensile strength of 1180 MPa or more. Thus, the C content is set to 0.09% or more and preferably set to 0.10% or more. On the other hand, when the C content is greater than 0.15%, formation of ferrite is suppressed, thus failing to obtain sufficient elongation. Thus, the C content is set to 0.15% or less and preferably set to 0.13% or less.

(Si: 0.2% to 2.5%)

Si suppresses formation of cementite to contribute to formation of granular bainite. The granular bainite is a structure in which a plurality of pieces of bainitic ferrite are turned into a single lump after dislocations existing on their interfaces are recovered. Therefore, when cementite exists on the interface of the bainitic ferrite, no granular bainite is formed there. When the Si content is less than 0.2%, cementite is formed excessively, failing to sufficiently obtain granular bainite. Thus, the Si content is set to 0.2% or more. On the other hand, when the Si content is greater than 2.5%, slab cracking is likely to occur during hot rolling. Thus, the Si content is set to 2.5% or less.

(Al: 0.01% to 1.00%)

Al suppresses formation of cementite to contribute to formation of granular bainite. The granular bainite is a structure in which a plurality of pieces of bainitic ferrite are turned into a single lump after dislocations existing on their interfaces are recovered. Therefore, when cementite exists on the interface of the bainitic ferrite, no granular bainite is formed there. Al is an element that can be utilized also as a deoxidizer. When the Al content is less than 0.01%, cementite is formed excessively, failing to sufficiently obtain granular bainite. Thus, the Al content is set to 0.01% or more. On the other hand, when the Al content is greater than 1.00%, slab cracking is likely to occur during hot rolling. Further, the number density of Al-based coarse inclusions increases, thus causing deterioration in hole expandability. Thus, the Al content is set to 1.00% or less.

(Mn: 1.0% to 3.0%)

Mn suppresses ferrite transformation in continuous annealing after cold rolling or in a heat treatment in a plating line to contribute to an improvement in strength. When the Mn content is less than 1.0% in total, the area fraction of the ferrite becomes excessive, resulting in difficulty in obtaining a tensile strength of 1180 MPa or more. Thus, the Mn content is set to 1.0% or more. On the other hand, when the Mn content is greater than 3.0%, the area fraction of the ferrite becomes too small, failing to obtain sufficient elongation. Thus, the Mn content is set to 3.0% or less in total.

(P: 0.02% or less)

P is not an essential element and is contained in, for example, steel as an impurity. P reduces hole expandability, reduces toughness by being segregated to the middle of the steel sheet in the sheet thickness direction, or makes a welded portion brittle. Thus, a lower P content is better. When the P content is greater than 0.04%, in particular, the reduction in hole expandability is prominent. Thus, the P content is set to 0.04% or less, and preferably set to 0.01% or less. Reducing the P content is expensive, and when the P content is tried to be reduced down to less than 0.0001%, its cost increases significantly.

(S: 0.01% or less)

S is not an essential element, and is contained in steel as an impurity, for example. S reduces weldability, reduces manufacturability at a casting time and a hot rolling time, and reduces hole expandability by forming coarse MnS. Thus, a lower S content is better. When the S content is greater than 0.01%, in particular, the reduction in weldability, the reduction in manufacturability, and the reduction in hole expandability are prominent. Thus, the S content is set to 0.01% or less and preferably set to 0.005% or less. Reducing the S content is expensive, and when the S content is tried to be reduced down to less than 0.0001%, its cost increases significantly.

(N: 0.01% or less)

N is not an essential element, and is contained in steel as an impurity, for example. N forms coarse nitrides. The coarse nitrides cause reductions in bendability and hole expandability and further make blowholes occur at the time of welding. Thus, a lower N content is better. When the N content is greater than 0.01%, in particular, the reduction in hole expandability and the occurrence of blowholes are prominent. Thus, the N content is set to 0.01% or less and preferably set to 0.008% or less. Reducing the N content is expensive, and when the N content is tried to be reduced down to less than 0.0005%, its cost increases significantly.

(O: 0.006% or less)

O is not an essential element, and is contained in steel as an impurity, for example. O forms coarse oxide. The coarse oxide causes reductions in bendability and hole expandability and further makes blowholes occur at the time of welding. Thus, a lower 0 content is better. When the 0 content is greater than 0.006%, in particular, the reduction in hole expandability and the occurrence of blowholes are prominent. Thus, the 0 content is set to 0.006% or less and preferably set to 0.005% or less. Reducing the 0 content is expensive, and when the 0 content is tried to be reduced down to less than 0.0005%, its cost increases significantly.

Cr, Mo, Ni, Cu, Nb, Ti, V, B, Ca, Mg, and REM are not an essential element, but are an arbitrary element that may be appropriately contained, up to a predetermined amount as a limit, in the steel sheet and the steel.

(Cr: 0.00% to 1.00%, Mo: 0.00% to 1.00%, Ni: 0.00% to 1.00%, Cu: 0.00% to 1.00%)

Cr, Mo, Ni, and Cu suppress ferrite transformation in the event of annealing after cold rolling or in the event of plating and contribute to an improvement in strength. Thus, Cr, Mo, Ni, or Cu, or an arbitrary combination of these may be contained. In order to obtain this effect sufficiently, preferably, the Cr content is set to 0.10% or more, the Mo content is set to 0.01% or more, the Ni content is set to 0.05% or more, and the Cu content is set to 0.05% or more. However, when the Cr content is greater than 1.00%, the Mo content is greater than 1.00%, the Ni content is greater than 1.00%, or the Cu content is greater than 1.00%, the area fraction of the ferrite becomes too small, failing to obtain sufficient elongation. Therefore, the Cr content, the Mo content, the Ni content, and the Cu content are each set to 1.00% or less. That is, preferably, Cr: 0.10% to 1.00%, Mo: 0.01% to 1.00%, Ni: 0.05% to 1.00%, or Cu: 0.05% to 1.00% is satisfied, or an arbitrary combination of these is satisfied.

(Nb: 0.000% to 0.30%, Ti: 0.000% to 0.30%, V: 0.000% to 0.50%)

Nb, Ti, and V increase the area of grain boundaries of austenite by grain refining of austenite during annealing after cold rolling or the like to promote ferrite transformation. Thus, Nb, Ti, or V, or an arbitrary combination of these may be contained. In order to obtain this effect sufficiently, preferably, the Nb content is set to 0.005% or more, the Ti content is set to 0.005% or more, and the V content is set to 0.005% or more. However, when the Nb content is greater than 0.30%, the Ti content is greater than 0.30%, or the V content is greater than 0.50%, the area fraction of the ferrite becomes excessive, failing to obtain a sufficient tensile strength. Therefore, the Nb content is set to 0.30% or less, the Ti content is set to 0.30% or less, and the V content is set to 0.50% or less. That is, preferably, Nb: 0.005% to 0.30%, Ti: 0.005% to 0.30%, or V: 0.005% to 0.50% is satisfied, or an arbitrary combination of these is satisfied.

(B: 0.0000% to 0.010%)

B segregates to grain boundaries of austenite during annealing after cold rolling or the like to suppress ferrite transformation. Thus, B may be contained. In order to obtain this effect sufficiently, the B content is preferably set to 0.0001% or more. However, when the B content is greater than 0.010%, the area fraction of the ferrite becomes too small, failing to obtain sufficient elongation. Therefore, the B content is set to 0.010% or less. That is, B: 0.0001% to 0.010% is preferably established.

(Ca: 0.0000% to 0.04%, Mg: 0.0000% to 0.04%, REM: 0.0000% to 0.04%)

Ca, Mg, and REM control forms of oxide and sulfide to contribute to an improvement in hole expandability. Thus, Ca, Mg, or REM or an arbitrary combination of these may be contained. In order to obtain this effect sufficiently, preferably, the Ca content, the Mg content, and the REM content are each set to 0.0005% or more. However, when the Ca content is greater than 0.04%, the Mg content is greater than 0.04%, or the REM content is greater than 0.04%, coarse oxide is formed, failing to obtain sufficient hole expandability. Therefore, the Ca content, the Mg content, and the REM content are each set to 0.04% or less and preferably set to 0.01% or less. That is, preferably, Ca: 0.0005% to 0.04%, Mg: 0.0005% to 0.04%, or REM: 0.0005% to 0.04% is satisfied, or an arbitrary combination of these is satisfied.

REM is a generic term for 17 types of elements in total of Sc, Y, and elements belonging to the lanthanoid series, and the REM content means the total content of these elements. REM is contained in misch metal, for example, and when adding REM, for example, misch metal is added, or metal REM such as metal La or metal Ce is added in some cases.

According to this embodiment, it is possible to obtain a tensile strength of 1180 MPa or more, elongation of 10% or more, hole expandability of 20% or more, and bendability, which is a VDA bending angle in the case where a thickness is set to t (mm) being "$7.69t^2-38.4t+109$" or more. That is, it is possible to obtain a high strength, and excellent elongation, hole expandability, and bendability. This steel sheet is easily formed into framework system parts of automobiles, for example, and can also ensure collision safety.

Next, there will be explained a method of manufacturing the steel sheet according to the embodiment of the present invention. In the method of manufacturing the steel sheet according to the embodiment of the present invention, hot rolling, pickling, cold rolling, and annealing of a slab having the above-described chemical composition are performed in this order.

The manufacturing method prior to casting is not limited in particular. That is, following smelting by a shaft furnace, an electric furnace, or the like, various types of secondary refining may be performed. Incidentally, as a raw material, scrap may be used.

A cast slab may be subjected to hot rolling after being cooled down to a low temperature once and then being heated again, or a cast slab may be subjected to hot rolling continuously.

The hot rolling is started at a temperature of 1100° C. or more and is completed at a temperature of the $Ar_3$ point or more. In the cold rolling, a reduction ratio is set to 30% or more and 80% or less. In the annealing, retention is performed for 10 seconds or more to the maximum heating temperature of the $Ac_1$ point or more and the $Ac_3$ point or less, in cooling thereafter, a cooling rate from the $Ar_3$ point to 650° C. is set to 0.5° C./second or more and 50° C./second or less, and a cooling rate from 650° C. to 450° C. is set to 0.5° C./second or more and 5° C./second or less.

When the starting temperature of the hot rolling is less than 1100° C., it is impossible to sufficiently solid-dissolve elements other than Fe in Fe and coarse alloy carbide remains to easily cause embrittlement during hot rolling. Thus, the hot rolling is started at a temperature of 1100° C. or more. The starting temperature of the hot rolling is a slab heating temperature, for example. As the slab, for example, a slab obtained by continuous casting or a slab fabricated by a thin slab caster can be used. The slab may be provided into a hot rolling facility while maintaining the slab to the temperature of 1100° C. or more after casting, or may also be provided into a hot rolling facility after the slab is cooled down to a temperature of less than 1100° C. and then is heated.

When the completing temperature of the hot rolling is less than the $Ar_3$ point, austenite and ferrite are contained in a metal structure of a hot-rolled steel sheet, resulting in that the shape of the hot-rolled steel sheet becomes worse to be difficult to perform treatments after the hot rolling such as cold rolling in some cases because the austenite and the ferrite are different in mechanical properties. Thus, the hot rolling is finished at a temperature of the $Ar_3$ point or more. When the hot rolling is finished at a temperature of the $Ar_3$ point or more, it is possible to relatively reduce a rolling load during the hot rolling.

The hot rolling includes rough rolling and finish rolling, and in the finish rolling, one in which a plurality of steel sheets obtained by rough rolling are joined may be rolled continuously. The finish rolling may be performed after a rough-rolled sheet is coiled once. A coiling temperature is set to 500° C. or more and 650° C. or less. When the coiling temperature is greater than 650° C., productivity deteriorates. Thus, the coiling temperature is set to 650° C. or less. On the other hand, when the coiling temperature is less than 500° C., the hardness of the hot-rolled steel sheet rises too high to be difficult to perform cold rolling thereafter. Thus, the coiling temperature is set to 500° C. or more.

The pickling is performed on the hot-rolled steel sheet obtained in this manner in order to remove oxides on the surface. The pickling is performed one time or two or more times. By the pickling, the oxides on the surface of the hot-rolled steel sheet are removed and chemical conversion treatability and platability improve.

When the reduction ratio of the cold rolling is less than 30%, it is difficult to keep the shape of a cold-rolled steel sheet flat or it is impossible to obtain sufficient ductility in some cases. Thus, the reduction ratio of the cold rolling is set to 30% or more. On the other hand, when the reduction ratio of the cold rolling is greater than 80%, a rolling load becomes large excessively to be difficult to perform the cold rolling. Thus, the reduction ratio of the cold rolling is set to 80% or less.

A heating rate in the case where the cold-rolled steel sheet is passed through in a continuous annealing line or a plating line is not restricted in particular.

In the annealing, the steel sheet is retained to the maximum heating temperature of the $Ac_1$ point or more and the $Ac_3$ point or less for 10 seconds or more, and thereby austenite is formed. The austenite is transformed into ferrite, granular bainite, bainite, or martensite through cooling to be performed later. When the maximum heating temperature is less than the $Ac_1$ point or the retention time is less than 10 seconds, the austenite is not formed sufficiently. On the other hand, when the maximum heating temperature is greater than the $Ac_3$ point, ferrite cannot be obtained and ductility goes short. Thus, the maximum heating temperature is set to the $Ac_1$ point or more and the $Ac_3$ point or less and the retention time is set to 10 seconds or more.

In the cooling from the maximum heating temperature, an average cooling rate from the $Ar_3$ point to 650° C. (first average cooling rate) is set to 0.5° C./second to 50° C./second. When the average cooling rate is less than 0.5° C./second, in the cooling process, ferrite or pearlite is formed excessively from austenite. As a result, it becomes difficult to secure a sufficient area fraction of martensite, resulting in difficulty in obtaining a tensile strength of 1180 MPa or more. No problem is caused in terms of the material even when the average cooling rate is increased, but when the average cooling rate is increased excessively, an increase in manufacturing cost is caused, and thus the average cooling rate is set to 50° C./second or less. A cooling method may be roll cooling, air cooling, or water cooling, or a combination of these.

An average cooling rate from 650° C. to 450° C. (second average cooling rate) is set to 0.5° C./second to 5° C./second, thereby making it possible to form an appropriate area fraction of granular bainite. As described above, the granular bainite is a structure in which a plurality of pieces of bainitic ferrite are turned into a single lump after dislocations existing on their interfaces are recovered. It is possible to generate such a dislocation recovery in a temperature zone of 650° C. or less. However, when the cooling rate in this temperature zone is greater than 5° C./second, it is impossible to sufficiently recover the dislocations, resulting in that the area fraction of the granular bainite sometimes becomes short. Thus, the cooling rate in this temperature zone is set to 5° C./second or less. On the other hand, when the cooling rate in this temperature zone is less than 0.5° C./second, the area fractions of the granular bainite and the bainite increase excessively to be difficult to obtain martensite necessary for a tensile strength of 1180 MPa or more. Thus, the cooling rate in this temperature zone is set to 0.5° C./second or more. A cooling method may be continuous cooling, inclined cooling, or isothermal holding, or a combination of these.

In this manner, it is possible to manufacture the steel sheet according to the embodiment of the present invention.

On the steel sheet, a plating treatment such as an electroplating treatment or a deposition plating treatment may be performed, and further an alloying treatment may be performed after the plating treatment. On the steel sheet, surface treatments such as organic coating film forming, film laminating, organic salts/inorganic salts treatment, and non-chromium treatment may be performed.

When a hot-dip galvanizing treatment is performed on the steel sheet as the plating treatment, for example, the steel sheet is heated or cooled to a temperature that is equal to or more than a temperature 40° C. lower than the temperature of a galvanizing bath and is equal to or less than a temperature 50° C. higher than the temperature of the galvanizing bath and is passed through the galvanizing bath. By the hot-dip galvanizing treatment, a steel sheet having a hot-dip galvanizing layer provided on the surface, namely a hot-dip galvanized steel sheet is obtained. The hot-dip galvanizing layer includes a chemical composition represented by, for example, Fe: 7 mass % or more and 15 mass % or less and the balance: Zn, Al, and impurities.

When an alloying treatment is performed after the hot-dip galvanizing treatment, for example, the hot-dip galvanized steel sheet is heated to a temperature that is 460° C. or more and 600° C. or less. When this temperature is less than 460° C., alloying sometimes becomes short. When this temperature is greater than 600° C., alloying becomes excessive and corrosion resistance deteriorates in some cases. By the alloying treatment, a steel sheet having an alloyed hot-dip galvanizing layer provided on the surface, namely, an alloyed hot-dip galvanized steel sheet is obtained.

It should be noted that the above-described embodiment merely illustrates a concrete example of implementing the present invention, and the technical scope of the present invention is not to be construed in a restrictive manner by the embodiment. That is, the present invention may be implemented in various forms without departing from the technical spirit or main features thereof.

EXAMPLE

Next, there will be explained examples of the present invention. Conditions of the examples are condition examples employed for confirming the applicability and effects of the present invention, and the present invention is not limited to these condition examples. The present invention can employ various conditions as long as the object of the present invention is achieved without departing from the spirit of the invention.

(First test)

In a first test, slabs having chemical compositions illustrated in Table 1 to Table 2 were manufactured, these slabs were hot rolled, and hot-rolled steel sheets were obtained. Each space in Table 1 to Table 2 indicates that the content of a corresponding element is less than a detection limit, and the balance is Fe and impurities. Each underline in Table 2 indicates that a corresponding numerical value is out of the range of the present invention.

TABLE 1

| SYMBOL OF STEEL | CHEMICAL COMPOSITION (MASS %) | | | | | | | | | | | |
|---|---|---|---|---|---|---|---|---|---|---|---|---|
| | C | Si | Mn | P | S | Al | N | O | Cr | Mo | Ni | Cu |
| A | 0.13 | 1.30 | 2.4 | 0.018 | 0.001 | 0.032 | 0.0061 | 0.0022 | 0.042 | | | |
| B | 0.10 | 2.30 | 2.9 | 0.002 | 0.009 | 0.025 | 0.0034 | 0.0017 | | | | |
| C | 0.12 | 0.45 | 2.3 | 0.001 | 0.003 | 0.230 | 0.0031 | 0.0023 | 0.021 | | | |
| D | 0.11 | 0.23 | 2.6 | 0.018 | 0.001 | 0.650 | 0.0046 | 0.0032 | 0.041 | | | |
| E | 0.13 | 0.53 | 1.6 | 0.012 | 0.009 | 0.026 | 0.0037 | 0.0013 | 0.4 | 0.029 | | |
| F | 0.13 | 0.67 | 1.2 | 0.007 | 0.006 | 0.041 | 0.0029 | 0.0043 | 2.9 | 0.024 | | |
| G | 0.10 | 0.52 | 2.5 | 0.003 | 0.005 | 0.051 | 0.0042 | 0.0040 | | | | |
| H | 0.09 | 0.55 | 2.8 | 0.014 | 0.008 | 0.030 | 0.0056 | 0.0017 | 0.120 | | | |
| I | 0.11 | 0.39 | 2.7 | 0.005 | 0.003 | 0.019 | 0.0052 | 0.0035 | 0.065 | 0.02 | | |
| J | 0.12 | 0.59 | 2.2 | 0.005 | 0.001 | 0.026 | 0.0064 | 0.0025 | 0.042 | 0.09 | | |
| K | 0.11 | 0.48 | 2.4 | 0.002 | 0.008 | 0.043 | 0.0008 | 0.0046 | 0.023 | | | 0.03 |
| L | 0.14 | 0.78 | 2.6 | 0.010 | 0.004 | 0.019 | 0.0001 | 0.0039 | 0.068 | | | 0.08 |
| M | 0.13 | 0.44 | 2.1 | 0.005 | 0.003 | 0.033 | 0.0014 | 0.0026 | 0.073 | | | |
| N | 0.13 | 0.45 | 2.3 | 0.012 | 0.005 | 0.031 | 0.0030 | 0.0038 | 0.046 | | | |
| O | 0.12 | 0.57 | 2.4 | 0.013 | 0.004 | 0.046 | 0.0007 | 0.0048 | 0.026 | | | |
| P | 0.14 | 0.52 | 2.6 | 0.012 | 0.004 | 0.042 | 0.0033 | 0.0040 | 0.069 | | | |
| Q | 0.12 | 0.58 | 2.7 | 0.011 | 0.007 | 0.074 | 0.0022 | 0.0012 | 0.044 | | | |
| R | 0.12 | 0.62 | 2.3 | 0.014 | 0.005 | 0.070 | 0.0043 | 0.0023 | 0.046 | | | |
| S | 0.12 | 0.55 | 2.6 | 0.010 | 0.008 | 0.041 | 0.0031 | 0.0029 | 0.058 | | | |
| T | 0.12 | 0.72 | 2.8 | 0.018 | 0.002 | 0.074 | 0.0053 | 0.0047 | | | | |
| U | 0.11 | 0.63 | 2.1 | 0.008 | 0.009 | 0.046 | 0.0014 | 0.0038 | 0.067 | | | |

TABLE 1-continued

| | C | Si | Mn | P | S | Al | N | O | Cr | Mo | Ni | Cu |
|---|---|---|---|---|---|---|---|---|---|---|---|---|
| V | 0.12 | 0.52 | 2.6 | 0.006 | 0.003 | 0.049 | 0.0021 | 0.0029 | 0.015 | | | |
| W | 0.11 | 0.50 | 2.8 | 0.001 | 0.004 | 0.019 | 0.0049 | 0.0056 | | | | |
| X | 0.12 | 0.52 | 2.6 | 0.001 | 0.001 | 0.021 | 0.0041 | 0.0021 | 0.050 | | | |
| Y | 0.11 | 0.51 | 2.8 | 0.001 | 0.001 | 0.071 | 0.0032 | 0.0023 | | | | |
| Z | 0.13 | 0.61 | 2.5 | 0.001 | 0.001 | 0.045 | 0.0026 | 0.0034 | | | | |

| SYMBOL OF STEEL | CHEMICAL COMPOSITION (MASS %) | | | | | | | $Ar_2$ POINT (°C.) | $Ac_1$ (°C.) | $Ac_3$ (°C.) |
|---|---|---|---|---|---|---|---|---|---|---|
| | Nb | Ti | V | B | Ca | Mg | REM | | | |
| A | 0.007 | 0.020 | | 0.0028 | | | | 722 | 735 | 871 |
| B | | 0.008 | | | | | | 724 | 759 | 905 |
| C | 0.014 | | | 0.0018 | | | | 713 | 711 | 837 |
| D | 0.022 | 0.023 | | 0.0034 | | | | 701 | 702 | 821 |
| E | 0.020 | 0.015 | | 0.0016 | | | | 760 | 721 | 860 |
| F | | | | 0.0011 | | | | 797 | 730 | 878 |
| G | 0.012 | 0.011 | | 0.0043 | | | | 698 | 711 | 837 |
| H | 0.010 | 0.008 | | | | | | 668 | 709 | 836 |
| I | 0.007 | | | 0.0029 | | | | 674 | 705 | 825 |
| J | | 0.025 | | 0.0011 | | | | 717 | 717 | 845 |
| K | 0.015 | 0.025 | | 0.0021 | | | | 701 | 711 | 837 |
| L | 0.021 | 0.009 | | 0.0042 | | | | 685 | 718 | 840 |
| M | | 0.013 | | 0.0021 | | | | 718 | 713 | 842 |
| N | 0.160 | 0.018 | | 0.0043 | | | | 702 | 711 | 836 |
| O | 0.024 | | | 0.0013 | | | | 701 | 714 | 839 |
| P | 0.016 | 0.130 | | 0.0020 | | | | 677 | 710 | 828 |
| Q | 0.010 | 0.008 | 0.1 | 0.0029 | | | | 679 | 711 | 831 |
| R | 0.021 | 0.025 | 0.4 | 0.0033 | | | | 712 | 716 | 845 |
| S | 0.013 | 0.016 | | | | | | 685 | 711 | 834 |
| T | | 0.009 | | 0.0065 | | | | 676 | 714 | 833 |
| U | 0.020 | 0.017 | | 0.0036 | 0.02 | | | 731 | 719 | 854 |
| V | 0.012 | 0.018 | | 0.0010 | | 0.01 | | 684 | 710 | 831 |
| W | 0.016 | 0.011 | | 0.0024 | | | 0.01 | 669 | 708 | 826 |
| X | 0.030 | 0.030 | | 0.0030 | | | | 683 | 710 | 832 |
| Y | | | | | | | | 721 | 720 | 865 |
| Z | | | | | | | | 718 | 725 | 864 |

TABLE 2

| SYMBOL OF STEEL | CHEMICAL COMPOSITION (MASS %) | | | | | | | | | | | |
|---|---|---|---|---|---|---|---|---|---|---|---|---|
| | C | Si | Mn | P | S | Al | N | O | Cr | Mo | Ni | Cu |
| a | <u>0.06</u> | 0.50 | 2.7 | 0.015 | 0.002 | 0.073 | 0.0024 | 0.0018 | 0.041 | | | |
| b | <u>0.18</u> | 0.60 | 2.1 | 0.014 | 0.008 | 0.020 | 0.0010 | 0.0050 | 0.026 | | | |
| c | 0.10 | <u>0.10</u> | 2.3 | 0.007 | 0.003 | 0.086 | 0.0014 | 0.0046 | 0.049 | | | |
| d | 0.12 | <u>2.90</u> | 1.7 | 0.017 | 0.001 | 0.091 | 0.0065 | 0.0049 | 0.048 | | | |
| e | 0.11 | 0.43 | <u>0.4</u> | 0.002 | 0.001 | 0.059 | 0.0037 | 0.0038 | 0.055 | | | |
| f | 0.10 | 0.45 | <u>3.4</u> | 0.005 | 0.006 | 0.059 | 0.0051 | 0.0026 | 0.010 | | | |
| g | 0.10 | 0.54 | 2.3 | <u>0.030</u> | 0.004 | 0.034 | 0.0034 | 0.0041 | 0.012 | | | |
| h | 0.13 | 0.48 | 2.4 | 0.009 | <u>0.015</u> | 0.078 | 0.0063 | 0.0049 | 0.062 | | | |
| i | 0.11 | 0.55 | 2.1 | 0.006 | 0.008 | <u>0.000</u> | 0.0039 | 0.0046 | 0.017 | | | |
| j | 0.12 | 0.65 | 2.5 | 0.001 | 0.001 | 1.020 | 0.0020 | 0.0024 | 0.029 | | | |
| k | 0.14 | 0.54 | 2.3 | 0.008 | 0.006 | 0.022 | <u>0.0090</u> | 0.0037 | 0.030 | | | |
| l | 0.11 | 0.57 | 2.3 | 0.017 | 0.008 | 0.083 | 0.0055 | <u>0.0080</u> | 0.032 | | | |
| m | 0.14 | 0.52 | 2.4 | 0.018 | 0.008 | 0.077 | 0.0054 | 0.0019 | <u>3.2</u> | 0.022 | | |
| n | 0.13 | 0.54 | 2.5 | 0.017 | 0.003 | 0.025 | 0.0032 | 0.0022 | | <u>1.200</u> | | |
| o | 0.11 | 0.48 | 2.4 | 0.016 | 0.009 | 0.037 | 0.0003 | 0.0022 | 0.020 | | <u>1.10</u> | |
| p | 0.11 | 0.39 | 2.3 | 0.002 | 0.006 | 0.072 | 0.0024 | 0.0043 | 0.034 | | | <u>1.2</u> |
| q | 0.12 | 0.62 | 2.2 | 0.009 | 0.004 | 0.030 | 0.0056 | 0.0015 | 0.043 | | | |
| r | 0.10 | 0.59 | 2.5 | 0.007 | 0.001 | 0.077 | 0.0060 | 0.0040 | 0.034 | | | |
| s | 0.12 | 0.72 | 1.9 | 0.004 | 0.006 | 0.015 | 0.0018 | 0.0013 | 0.031 | | | |
| t | 0.11 | 0.58 | 2.1 | 0.002 | 0.004 | 0.097 | 0.0062 | 0.0019 | 0.022 | | | |
| u | 0.13 | 0.66 | 2.3 | 0.013 | 0.003 | 0.044 | 0.0038 | 0.0024 | 0.055 | | | |
| v | 0.10 | 0.49 | 2.0 | 0.009 | 0.008 | 0.020 | 0.0002 | 0.0041 | 0.057 | | | |
| w | 0.10 | 0.61 | 2.1 | 0.002 | 0.005 | 0.034 | 0.0028 | 0.0033 | 0.051 | | | |

| SYMBOL OF STEEL | CHEMICAL COMPOSITION (MASS %) | | | | | | | $Ar_2$ POINT (°C.) | $Ac_1$ (°C.) | $Ac_3$ (°C.) |
|---|---|---|---|---|---|---|---|---|---|---|
| | Nb | Ti | V | B | Ca | Mg | REM | | | |
| a | 0.019 | 0.008 | | 0.0022 | | | | 695 | 709 | 840 |
| b | 0.023 | 0.026 | | 0.0038 | | | | 707 | 718 | 838 |
| c | 0.009 | 0.008 | | 0.0021 | | | | 702 | 701 | 826 |
| d | 0.016 | 0.009 | | 0.0017 | | | | 836 | 789 | 965 |

TABLE 2-continued

| | | | | | | | | | |
|---|---|---|---|---|---|---|---|---|---|
| e | 0.015 | 0.021 | 0.0029 | | | 860 | 731 | 896 |
| f | 0.019 | 0.023 | 0.0028 | | | 624 | 700 | 808 |
| g | 0.010 | 0.020 | 0.0011 | | | 714 | 714 | 845 |
| h | 0.016 | 0.024 | 0.0029 | | | 697 | 711 | 835 |
| i | 0.006 | 0.020 | 0.0029 | | | 726 | 717 | 849 |
| j | 0.010 | 0.026 | 0.0039 | | | 735 | 715 | 840 |
| k | 0.017 | 0.018 | 0.0032 | | | 701 | 714 | 837 |
| l | 0.007 | 0.022 | 0.0017 | | | 714 | 715 | 845 |
| m | 0.014 | 0.009 | 0.0035 | | | 695 | 712 | 833 |
| n | 0.020 | 0.023 | 0.0025 | | | 689 | 712 | 870 |
| o | 0.021 | 0.008 | 0.0033 | | | 701 | 711 | 821 |
| p | 0.017 | 0.021 | 0.0013 | | | 708 | 710 | 837 |
| q | <u>0.350</u> | 0.017 | 0.0035 | | | 718 | 718 | 848 |
| r | 0.027 | <u>0.320</u> | 0.0040 | | | 702 | 713 | 842 |
| s | 0.016 | 0.026 | <u>0.6</u> 0.0032 | | | 745 | 724 | 861 |
| t | 0.026 | 0.017 | <u>0.0120</u> | | | 731 | 717 | 851 |
| u | 0.024 | 0.013 | 0.0011 | <u>0.05</u> | | 709 | 718 | 845 |
| v | 0.017 | 0.015 | 0.0039 | | <u>0.06</u> | 736 | 716 | 853 |
| w | 0.012 | 0.018 | 0.0012 | | <u>0.05</u> | 732 | 718 | 855 |

Next, of the hot-rolled steel sheets, pickling, cold rolling, and annealing were performed, and steel sheets were obtained. Conditions of the hot rolling, the cold rolling, and the annealing are illustrated in Table 3 to Table 7. Each underline in Table 3 to Table 7 indicates that a corresponding numerical value is out of a range suitable for the manufacture of the steel sheet according to the present invention.

TABLE 3

| | | | | | HOT ROLLING | | | | ANNEALING | |
|---|---|---|---|---|---|---|---|---|---|---|
| SAMPLE NO. | SYMBOL OF STEEL | Ar$_3$ POINT (° C.) | Ac$_1$ (° C.) | Ac$_3$ (° C.) | SLAB HEATING TEMPERATURE (° C.) | FINISH ROLLING FINISHING TEMPERATURE (° C.) | COILING TEMPERATURE (° C.) | COLD ROLLING REDUCTION RATIO (%) | MAXIMUM HEATING TEMPERATURE (° C.) | RETENTION TIME (SECOND) |
| 1 | A | 722 | 735 | 871 | 1120 | 818 | 618 | 40 | 820 | 134 |
| 2 | A | 722 | 735 | 871 | 1260 | 834 | 502 | 54 | 824 | 206 |
| 3 | A | 722 | 735 | 871 | 1169 | 807 | 561 | 60 | 814 | 164 |
| 4 | A | 722 | 735 | 871 | 1143 | 807 | 643 | 58 | 825 | 206 |
| 5 | B | 724 | 759 | 907 | 1156 | 744 | 444 | 44 | 856 | 203 |
| 6 | B | 724 | 759 | 907 | 1199 | 824 | 530 | 56 | 846 | 156 |
| 7 | B | 724 | 759 | 907 | 1109 | 857 | 564 | 61 | 855 | 18 |
| 8 | B | 724 | 759 | 907 | 1125 | 869 | 592 | 61 | 856 | 172 |
| 9 | C | 713 | 711 | 837 | 1170 | 843 | 460 | 52 | 793 | 214 |
| 10 | C | 713 | 711 | 837 | 1255 | 769 | 630 | 50 | 799 | 80 |
| 11 | C | 713 | 711 | 837 | 1138 | 823 | 632 | 51 | 787 | 204 |
| 12 | C | 713 | 711 | 837 | 1109 | 778 | 618 | 54 | 780 | 167 |
| 13 | D | 701 | 702 | 821 | 1194 | 781 | 592 | 35 | 770 | 187 |
| 14 | D | 701 | 702 | 821 | 1194 | 781 | 592 | 68 | 772 | 179 |
| 15 | D | 701 | 702 | 821 | 1194 | 781 | 592 | 57 | 767 | 78 |
| 16 | D | 701 | 702 | 821 | 1194 | 781 | 592 | 53 | 780 | 118 |
| 17 | E | 760 | 721 | 860 | 1115 | 886 | 426 | 68 | 794 | 158 |
| 18 | E | 760 | 721 | 860 | 1115 | 886 | 426 | 49 | 818 | 159 |
| 19 | E | 760 | 721 | 860 | 1115 | 886 | 426 | 52 | 804 | 97 |
| 20 | E | 760 | 721 | 860 | 1115 | 886 | 426 | 50 | 817 | 58 |
| 21 | F | 797 | 730 | 878 | 1123 | 925 | 426 | 68 | 805 | 158 |
| 22 | F | 797 | 730 | 878 | 1123 | 925 | 426 | 57 | 830 | 201 |
| 23 | F | 797 | 730 | 878 | 1123 | 925 | 426 | 52 | 830 | 138 |
| 24 | F | 797 | 730 | 878 | 1123 | 925 | 426 | 62 | 820 | 29 |

| | ANNEALING | | | | | |
|---|---|---|---|---|---|---|
| SAMPLE NO. | FIRST AVERAGE COOLING RATE (° C./SECOND) | SECOND AVERAGE COOLING RATE (° C./SECOND) | PRESENCE OR ABSENCE OF PLATING TREATMENT | PRESENCE OR ABSENCE OF ALLOYING TREATMENT | PRESENCE OR ABSENCE OF TEMPERING | NOTE |
| 1 | 11 | 1 | ABSENT | ABSENT | ABSENT | EXAMPLE |
| 2 | 26 | 4 | ABSENT | ABSENT | ABSENT | EXAMPLE |
| 3 | 33 | 3 | ABSENT | ABSENT | ABSENT | EXAMPLE |
| 4 | 33 | 4 | ABSENT | ABSENT | ABSENT | EXAMPLE |
| 5 | 24 | 2 | ABSENT | ABSENT | ABSENT | EXAMPLE |

TABLE 3-continued

| | | | | | | |
|---|---|---|---|---|---|---|
| 6 | 21 | 3 | ABSENT | ABSENT | ABSENT | EXAMPLE |
| 7 | 8 | 2 | ABSENT | ABSENT | ABSENT | EXAMPLE |
| 8 | 41 | 3 | ABSENT | ABSENT | ABSENT | EXAMPLE |
| 9 | 31 | 4 | ABSENT | ABSENT | ABSENT | EXAMPLE |
| 10 | 20 | 3 | ABSENT | ABSENT | ABSENT | EXAMPLE |
| 11 | 19 | 4 | ABSENT | ABSENT | ABSENT | EXAMPLE |
| 12 | 2 | 2 | ABSENT | ABSENT | ABSENT | EXAMPLE |
| 13 | 21 | 2 | ABSENT | ABSENT | ABSENT | EXAMPLE |
| 14 | 32 | 4 | ABSENT | ABSENT | ABSENT | EXAMPLE |
| 15 | 26 | 4 | ABSENT | ABSENT | ABSENT | EXAMPLE |
| 16 | 14 | 4 | ABSENT | ABSENT | ABSENT | EXAMPLE |
| 17 | 31 | 4 | ABSENT | ABSENT | ABSENT | EXAMPLE |
| 18 | 34 | 2 | ABSENT | ABSENT | ABSENT | EXAMPLE |
| 19 | 12 | 3 | ABSENT | ABSENT | ABSENT | EXAMPLE |
| 20 | 44 | 4 | ABSENT | ABSENT | ABSENT | EXAMPLE |
| 21 | 31 | 4 | ABSENT | ABSENT | ABSENT | EXAMPLE |
| 22 | 11 | 4 | ABSENT | ABSENT | ABSENT | EXAMPLE |
| 23 | 28 | 1 | ABSENT | ABSENT | ABSENT | EXAMPLE |
| 24 | 26 | 4 | ABSENT | ABSENT | ABSENT | EXAMPLE |

TABLE 4

| SAMPLE NO. | SYMBOL OF STEEL | $Ar_2$ POINT (° C.) | $Ac_1$ (° C.) | $Ac_3$ (° C.) | HOT ROLLING SLAB HEATING TEMPERATURE (° C.) | HOT ROLLING FINISH ROLLING FINISHING TEMPERATURE (° C.) | HOT ROLLING COILING TEMPERATURE (° C.) | COLD ROLLING REDUCTION RATIO (%) | ANNEALING MAXIMUM HEATING TEMPERATURE (° C.) |
|---|---|---|---|---|---|---|---|---|---|
| 25 | G | 698 | 711 | 837 | 1251 | 783 | 587 | 58 | 792 |
| 26 | G | 698 | 711 | 837 | 1251 | 783 | 587 | 46 | 791 |
| 27 | G | 698 | 711 | 837 | 1251 | 783 | 587 | 54 | 795 |
| 28 | G | 698 | 711 | 837 | 1251 | 783 | 587 | 55 | 796 |
| 29 | G | 698 | 711 | 837 | 1251 | 783 | 587 | 61 | 795 |
| 30 | H | 668 | 709 | 836 | 1215 | 728 | 498 | 60 | 794 |
| 31 | H | 668 | 709 | 836 | 1215 | 728 | 498 | 66 | 795 |
| 32 | H | 668 | 709 | 836 | 1215 | 728 | 498 | 43 | 794 |
| 33 | H | 668 | 709 | 836 | 1215 | 728 | 498 | 61 | 796 |
| 34 | H | 668 | 709 | 836 | 1215 | 728 | 498 | 53 | 795 |
| 35 | H | 668 | 709 | 836 | 1215 | 728 | 498 | 50 | 795 |
| 36 | I | 674 | 705 | 825 | 1184 | 764 | 423 | 67 | 786 |
| 37 | I | 674 | 705 | 825 | 1184 | 764 | 423 | 65 | 789 |
| 38 | I | 674 | 705 | 825 | 1184 | 764 | 423 | 53 | 788 |
| 39 | I | 674 | 705 | 825 | 1184 | 764 | 423 | 45 | 787 |
| 40 | I | 674 | 705 | 825 | 1184 | 764 | 423 | 65 | 786 |
| 41 | I | 674 | 705 | 825 | 1184 | 764 | 423 | 53 | 786 |
| 42 | J | 717 | 717 | 845 | 1167 | 860 | 423 | 67 | 802 |
| 43 | J | 717 | 717 | 845 | 1167 | 860 | 423 | 65 | 804 |
| 44 | J | 717 | 717 | 845 | 1167 | 860 | 423 | 53 | 800 |
| 45 | J | 717 | 717 | 845 | 1167 | 860 | 423 | 45 | 804 |
| 46 | J | 717 | 717 | 845 | 1167 | 860 | 423 | 57 | 803 |
| 47 | J | 717 | 717 | 845 | 1167 | 860 | 423 | 52 | 804 |

| SAMPLE NO. | ANNEALING RETENTION TIME (SECOND) | ANNEALING FIRST AVERAGE COOLING RATE (° C./SECOND) | ANNEALING SECOND AVERAGE COOLING RATE (° C./SECOND) | PRESENCE OR ABSENCE OF PLATING TREATMENT | PRESENCE OR ABSENCE OF ALLOYING TREATMENT | PRESENCE OR ABSENCE OF TEMPERING | NOTE |
|---|---|---|---|---|---|---|---|
| 25 | 15 | 26 | 4 | ABSENT | ABSENT | ABSENT | EXAMPLE |
| 26 | 300 | 34 | 2 | ABSENT | ABSENT | ABSENT | EXAMPLE |
| 27 | 117 | 23 | 4 | ABSENT | ABSENT | ABSENT | EXAMPLE |
| 28 | 65 | 39 | 3 | ABSENT | ABSENT | ABSENT | EXAMPLE |
| 29 | 61 | 36 | 3 | ABSENT | ABSENT | ABSENT | EXAMPLE |
| 30 | 121 | 1 | 3 | ABSENT | ABSENT | ABSENT | EXAMPLE |
| 31 | 197 | 15 | 2 | ABSENT | ABSENT | ABSENT | EXAMPLE |
| 32 | 136 | 48 | 4 | ABSENT | ABSENT | ABSENT | EXAMPLE |
| 33 | 172 | 24 | 5 | ABSENT | ABSENT | ABSENT | EXAMPLE |
| 34 | 42 | 6 | 4 | ABSENT | ABSENT | ABSENT | EXAMPLE |
| 35 | 162 | 5 | 2 | ABSENT | ABSENT | ABSENT | EXAMPLE |
| 36 | 119 | 33 | 1 | ABSENT | ABSENT | ABSENT | EXAMPLE |
| 37 | 61 | 18 | 2 | ABSENT | ABSENT | ABSENT | EXAMPLE |
| 38 | 151 | 24 | 3 | ABSENT | ABSENT | ABSENT | EXAMPLE |
| 39 | 121 | 11 | 5 | ABSENT | ABSENT | ABSENT | EXAMPLE |

TABLE 4-continued

| | | | | | | | |
|---|---|---|---|---|---|---|---|
| 40 | 166 | 32 | 1 | ABSENT | ABSENT | ABSENT | EXAMPLE |
| 41 | 63 | 23 | 1 | ABSENT | ABSENT | ABSENT | EXAMPLE |
| 42 | 119 | 33 | 1 | ABSENT | ABSENT | ABSENT | EXAMPLE |
| 43 | 61 | 18 | 2 | ABSENT | ABSENT | ABSENT | EXAMPLE |
| 44 | 151 | 24 | 3 | ABSENT | ABSENT | ABSENT | EXAMPLE |
| 45 | 121 | 11 | 5 | ABSENT | ABSENT | ABSENT | EXAMPLE |
| 46 | 80 | 24 | 1 | ABSENT | ABSENT | ABSENT | EXAMPLE |
| 47 | 30 | 4 | 3 | ABSENT | ABSENT | ABSENT | EXAMPLE |

TABLE 5

| | | | | | HOT ROLLING | | | | |
|---|---|---|---|---|---|---|---|---|---|
| SAMPLE NO. | SYMBOL OF STEEL | $Ar_2$ POINT (° C.) | $Ac_1$ (° C.) | $Ac_3$ (° C.) | SLAB HEATING TEMPERATURE (° C.) | FINISH ROLLING FINISHING TEMPERATURE (° C.) | COILING TEMPERATURE (° C.) | COLD ROLLING REDUCTION RATIO (%) | ANNEALING MAXIMUM HEATING TEMPERATURE (° C.) |
| 48 | K | 701 | 711 | 837 | 1146 | 789 | 484 | 45 | 798 |
| 49 | K | 701 | 711 | 837 | 1150 | 768 | 473 | 50 | 795 |
| 50 | K | 701 | 711 | 837 | 1106 | 851 | 577 | 50 | 797 |
| 51 | K | 701 | 711 | 837 | 1249 | 780 | 606 | 65 | 794 |
| 52 | K | 701 | 711 | 837 | 1122 | 818 | 590 | 64 | 796 |
| 53 | L | 685 | 718 | 840 | 1188 | 795 | 617 | 64 | 800 |
| 54 | M | 718 | 713 | 842 | 1151 | 807 | 646 | 51 | 794 |
| 55 | N | 702 | 711 | 836 | 1166 | 778 | 562 | 65 | 786 |
| 56 | O | 701 | 714 | 839 | 1140 | 755 | 604 | 62 | 801 |
| 57 | P | 677 | 710 | 828 | 1153 | 735 | 580 | 63 | 789 |
| 58 | Q | 679 | 711 | 831 | 1147 | 799 | 624 | 57 | 784 |
| 59 | R | 712 | 716 | 845 | 1101 | 796 | 605 | 63 | 801 |
| 60 | S | 685 | 711 | 834 | 1182 | 789 | 580 | 56 | 794 |
| 61 | T | 676 | 714 | 835 | 1181 | 751 | 646 | 52 | 794 |
| 62 | U | 731 | 719 | 854 | 1190 | 810 | 643 | 65 | 809 |
| 63 | V | 684 | 710 | 831 | 1103 | 744 | 619 | 58 | 791 |
| 64 | W | 669 | 708 | 826 | 1135 | 778 | 635 | 61 | 786 |
| 65 | X | 683 | 710 | 832 | 1130 | 760 | 592 | 57 | 786 |
| 66 | X | 683 | 710 | 832 | 1130 | 760 | 592 | 60 | 790 |
| 67 | Y | 721 | 720 | 865 | 1230 | 800 | 560 | 54 | 820 |
| 68 | Z | 718 | 725 | 864 | 1200 | 810 | 570 | 58 | 810 |

| | | ANNEALING | | | | | |
|---|---|---|---|---|---|---|---|
| SAMPLE NO. | RETENTION TIME (SECOND) | FIRST AVERAGE COOLING RATE (° C./SECOND) | SECOND AVERAGE COOLING RATE (° C./SECOND) | PRESENCE OR ABSENCE OF PLATING TREATMENT | PRESENCE OR ABSENCE OF ALLOYING TREATMENT | PRESENCE OR ABSENCE OF TEMPERING | NOTE |
| 48 | 153 | 26 | 3 | ABSENT | ABSENT | ABSENT | EXAMPLE |
| 49 | 112 | 16 | 4 | PRESENT | ABSENT | ABSENT | EXAMPLE |
| 50 | 221 | 18 | 3 | PRESENT | PRESENT | ABSENT | EXAMPLE |
| 51 | 185 | 30 | 4 | ABSENT | ABSENT | PRESENT (POST-PROCESS) | EXAMPLE |
| 52 | 26 | 22 | 5 | ABSENT | ABSENT | ABSENT | EXAMPLE |
| 53 | 12 | 15 | 2 | ABSENT | ABSENT | ABSENT | EXAMPLE |
| 54 | 165 | 28 | 1 | ABSENT | ABSENT | ABSENT | EXAMPLE |
| 55 | 194 | 14 | 4 | ABSENT | ABSENT | ABSENT | EXAMPLE |
| 56 | 26 | 5 | 3 | ABSENT | ABSENT | ABSENT | EXAMPLE |
| 57 | 40 | 11 | 3 | ABSENT | ABSENT | ABSENT | EXAMPLE |
| 58 | 101 | 25 | 4 | ABSENT | ABSENT | ABSENT | EXAMPLE |
| 59 | 92 | 3 | 5 | ABSENT | ABSENT | ABSENT | EXAMPLE |
| 60 | 86 | 10 | 3 | ABSENT | ABSENT | ABSENT | EXAMPLE |
| 61 | 81 | 11 | 4 | ABSENT | ABSENT | ABSENT | EXAMPLE |
| 62 | 112 | 6 | 1 | ABSENT | ABSENT | ABSENT | EXAMPLE |
| 63 | 49 | 21 | 2 | ABSENT | ABSENT | ABSENT | EXAMPLE |
| 64 | 180 | 43 | 2 | ABSENT | ABSENT | ABSENT | EXAMPLE |
| 65 | 121 | 4 | 3 | ABSENT | ABSENT | ABSENT | EXAMPLE |

TABLE 5-continued

| | | | | | | | |
|---|---|---|---|---|---|---|---|
| 66 | 75 | 32 | 5 | ABSENT | ABSENT | ABSENT | EXAMPLE |
| 67 | 140 | 21 | 2 | PRESENT | PRESENT | ABSENT | EXAMPLE |
| 68 | 95 | 35 | 3 | ABSENT | ABSENT | ABSENT | EXAMPLE |

TABLE 6

| | | | | | HOT ROLLING | | | |
|---|---|---|---|---|---|---|---|---|
| SAMPLE NO. | SYMBOL OF STEEL | Ar$_3$ POINT (° C.) | Ac$_1$ (° C.) | Ac$_3$ (° C.) | SLAB HEATING TEMPERATURE (° C.) | FINISH ROLLING FINISHING TEMPERATURE (° C.) | COILING TEMPERATURE (° C.) | COLD ROLLING REDUCTION RATIO (%) | ANNEALING MAXIMUM HEATING TEMPERATURE (° C.) |
| 71 | a | 695 | 709 | 840 | 1151 | 814 | 565 | 54 | 799 |
| 72 | b | 707 | 718 | 838 | 1157 | 796 | 562 | 59 | 794 |
| 73 | c | 702 | 701 | 826 | 1168 | 820 | 650 | 60 | 775 |
| 74 | d | 836 | 789 | 965 | 1198 | 905 | 641 | 51 | 902 |
| 75 | e | 860 | 731 | 896 | 1116 | 931 | 644 | 65 | 855 |
| 76 | f | 624 | 700 | 808 | 1172 | 680 | 587 | 50 | 774 |
| 77 | g | 714 | 714 | 845 | 1126 | 819 | 587 | 54 | 792 |
| 78 | h | 697 | 711 | 835 | 1160 | 789 | 606 | 63 | 782 |
| 79 | i | 726 | 717 | 849 | 1171 | 838 | 616 | 55 | 798 |
| 80 | j | 735 | 715 | 840 | 1157 | 801 | 560 | 60 | 791 |
| 81 | k | 701 | 714 | 837 | 1124 | 769 | 588 | 63 | 798 |
| 82 | l | 714 | 715 | 845 | 1117 | 810 | 573 | 59 | 801 |
| 83 | m | 695 | 712 | 833 | 1149 | 797 | 570 | 60 | 791 |
| 84 | n | 689 | 712 | 870 | 1173 | 805 | 628 | 50 | 808 |
| 85 | o | 701 | 711 | 821 | 1171 | 762 | 621 | 60 | 777 |
| 86 | p | 708 | 710 | 837 | 1164 | 792 | 582 | 60 | 780 |
| 87 | q | 718 | 718 | 848 | 1139 | 809 | 595 | 54 | 792 |
| 88 | r | 702 | 713 | 842 | 1173 | 764 | 632 | 65 | 792 |
| 89 | s | 745 | 724 | 861 | 1154 | 853 | 625 | 59 | 814 |
| 90 | t | 731 | 717 | 851 | 1178 | 810 | 565 | 54 | 801 |
| 91 | u | 709 | 718 | 845 | 1130 | 801 | 635 | 61 | 807 |
| 92 | v | 736 | 716 | 853 | 1126 | 808 | 630 | 62 | 802 |
| 93 | w | 732 | 718 | 855 | 1192 | 849 | 623 | 64 | 814 |

| | ANNEALING | | | | | | |
|---|---|---|---|---|---|---|---|
| SAMPLE NO. | RETENTION TIME (SECOND) | FIRST AVERAGE COOLING RATE (° C./SECOND) | SECOND AVERAGE COOLING RATE (° C./SECOND) | PRESENCE OR ABSENCE OF PLATING TREATMENT | PRESENCE OR ABSENCE OF ALLOYING TREATMENT | PRESENCE OR ABSENCE OF TEMPERING | NOTE |
| 71 | 50 | 40 | 2 | ABSENT | ABSENT | ABSENT | COMPARATIVE EXAMPLE |
| 72 | 206 | 13 | 4 | ABSENT | ABSENT | ABSENT | COMPARATIVE EXAMPLE |
| 73 | 55 | 5 | 1 | ABSENT | ABSENT | ABSENT | COMPARATIVE EXAMPLE |
| 74 | 116 | 5 | 3 | ABSENT | ABSENT | ABSENT | COMPARATIVE EXAMPLE |
| 75 | 134 | 34 | 2 | ABSENT | ABSENT | ABSENT | COMPARATIVE EXAMPLE |
| 76 | 99 | 21 | 3 | ABSENT | ABSENT | ABSENT | COMPARATIVE EXAMPLE |
| 77 | 87 | 15 | 3 | ABSENT | ABSENT | ABSENT | COMPARATIVE EXAMPLE |
| 78 | 116 | 2 | 3 | ABSENT | ABSENT | ABSENT | COMPARATIVE EXAMPLE |
| 79 | 114 | 29 | 3 | ABSENT | ABSENT | ABSENT | COMPARATIVE EXAMPLE |
| 80 | 78 | 35 | 4 | ABSENT | ABSENT | ABSENT | COMPARATIVE EXAMPLE |
| 81 | 56 | 30 | 2 | ABSENT | ABSENT | ABSENT | COMPARATIVE EXAMPLE |
| 82 | 110 | 7 | 5 | ABSENT | ABSENT | ABSENT | COMPARATIVE EXAMPLE |
| 83 | 107 | 38 | 2 | ABSENT | ABSENT | ABSENT | COMPARATIVE EXAMPLE |
| 84 | 138 | 28 | 2 | ABSENT | ABSENT | ABSENT | COMPARATIVE EXAMPLE |
| 85 | 204 | 24 | 2 | ABSENT | ABSENT | ABSENT | COMPARATIVE EXAMPLE |
| 86 | 51 | 6 | 1 | ABSENT | ABSENT | ABSENT | COMPARATIVE EXAMPLE |
| 87 | 183 | 43 | 5 | ABSENT | ABSENT | ABSENT | COMPARATIVE EXAMPLE |
| 88 | 139 | 17 | 3 | ABSENT | ABSENT | ABSENT | COMPARATIVE EXAMPLE |
| 89 | 31 | 18 | 1 | ABSENT | ABSENT | ABSENT | COMPARATIVE EXAMPLE |
| 90 | 81 | 7 | 3 | ABSENT | ABSENT | ABSENT | COMPARATIVE EXAMPLE |

TABLE 6-continued

| 91 | 186 | 32 | 1 | ABSENT | ABSENT | ABSENT | COMPARATIVE EXAMPLE |
| 92 | 164 | 40 | 1 | ABSENT | ABSENT | ABSENT | COMPARATIVE EXAMPLE |
| 93 | 94 | 21 | 3 | ABSENT | ABSENT | ABSENT | COMPARATIVE EXAMPLE |

TABLE 7

| | | | | | HOT ROLLING | | | COLD | ANNEALING | |
| | | | | | | | | | | |
| SAMPLE NO. | SYMBOL OF STEEL | $Ar_3$ POINT (° C.) | $Ac_1$ (° C.) | $Ac_3$ (° C.) | SLAB HEATING TEMPERATURE (° C.) | FINISH ROLLING FINISHING TEMPERATURE (° C.) | COILING TEMPERATURE (° C.) | ROLLING REDUCTION RATIO (%) | MAXIMUM HEATING TEMPERATURE (° C.) | RETENTION TIME (SECOND) |
|---|---|---|---|---|---|---|---|---|---|---|
| 94 | X | 683 | 710 | 832 | 1000 | 757 | CRACKING OCCURS IN THE MIDDLE OF HOT ROLLING AND SHEET PASSING THEREAFTER IS IMPOSSIBLE | | | |
| 95 | X | 683 | 710 | 832 | 1130 | 653 | SHAPE BECOMES WORSE IN THE MIDDLE OF HOT ROLLING AND SHEET PASSING THEREATER IS IMPOSSIBLE | | | |
| 96 | X | 683 | 710 | 832 | 1130 | 813 | 380 | LOAD OF COLD ROLLING BECOMES LARGE EXCESSIVELY AND COLD ROLLING IS IMPOSSISLE | | |
| 97 | X | 683 | 710 | 832 | 1130 | 813 | 700 | 61 | 793 | 174 |
| 98 | X | 683 | 710 | 832 | 1130 | 813 | 630 | 13 | SHAPE BECOME WORSE IN THE MIDDLE OF COLD ROLLING AND SHEET PASSING THEREAFTER IS IMPOSSIELE | |
| 99 | X | 683 | 710 | 832 | 1130 | 813 | 630 | 90 | LOAD OF COLD ROLLING BECOMES LARGE EXCESSIVELY AND SHEET PASSING THREAFTER IS IMPOSSIBLE | |
| 100 | X | 683 | 710 | 832 | 1130 | 813 | 630 | 47 | 860 | 177 |
| 101 | X | 683 | 710 | 832 | 1130 | 813 | 630 | 47 | 670 | 29 |
| 102 | X | 683 | 710 | 832 | 1130 | 813 | 630 | 47 | 784 | 0 |
| 103 | X | 683 | 710 | 832 | 1130 | 813 | 630 | 47 | 788 | 8 |
| 104 | X | 683 | 710 | 832 | 1130 | 813 | 630 | 47 | 781 | 100 |
| 105 | X | 683 | 710 | 832 | 1130 | 813 | 630 | 47 | 793 | 100 |
| 106 | X | 683 | 710 | 832 | 1130 | 813 | 630 | 47 | 798 | 100 |
| 107 | X | 683 | 710 | 832 | 1130 | 813 | 630 | 47 | 779 | 100 |
| 108 | X | 683 | 710 | 632 | 1130 | 813 | 630 | 47 | 780 | 100 |

| SAMPLE NO. | ANNEALING FIRST AVERAGE COOLING RATE (° C./SECOND) | ANNEALING SECOND AVERAGE COOLING RATE (° C./SECOND) | PRESENCE OR ABSENCE OF PLATING TREATMENT | PRESENCE OR ABSENCE OF ALLOYING TREATMENT | PRESENCE OR ABSENCE OF TEMPERING | NOTE |
|---|---|---|---|---|---|---|
| 94 | CRACKING OCCURS IN THE MIDDLE OF HOT ROLLING AND SHEET PASSING THEREAFTER IS IMPOSSIBLE | | | | | COMPARATIVE EXAMPLE |
| 95 | SHAPE BECOMES WORSE IN THE MIDDLE OF HOT ROLLING AND SHEET PASSING THEREATER IS IMPOSSIBLE | | | | | COMPARATIVE EXAMPLE |
| 96 | LOAD OF COLD ROLLING BECOMES LARGE EXCESSIVELY AND COLD ROLLING IS IMPOSSISLE | | | | | COMPARATIVE EXAMPLE |
| 97 | 15 | 4 | ABSENT | ABSENT | ABSENT | COMPARATIVE EXAMPLE |
| 98 | SHAPE BECOME WORSE IN THE MIDDLE OF COLD ROLLING AND SHEET PASSING THEREAFTER IS IMPOSSIELE | | | | | COMPARATIVE EXAMPLE |
| 99 | LOAD OF COLD ROLLING BECOMES LARGE EXCESSIVELY AND SHEET PASSING THREAFTER IS IMPOSSIBLE | | | | | COMPARATIVE EXAMPLE |
| 100 | 24 | 4 | ABSENT | ABSENT | ABSENT | COMPARATIVE EXAMPLE |
| 101 | 15 | 2 | ABSENT | ABSENT | ABSENT | COMPARATIVE EXAMPLE |
| 102 | 17 | 2 | ABSENT | ABSENT | ABSENT | COMPARATIVE EXAMPLE |
| 103 | 32 | 3 | ABSENT | ABSENT | ABSENT | COMPARATIVE EXAMPLE |
| 104 | 0.1 | 3 | ABSENT | ABSENT | ABSENT | COMPARATIVE EXAMPLE |
| 105 | 68 | 2 | ABSENT | ABSENT | ABSENT | COMPARATIVE EXAMPLE |
| 106 | 24 | 0.1 | ABSENT | ABSENT | ABSENT | COMPARATIVE EXAMPLE |
| 107 | 28 | 0.3 | ABSENT | ABSENT | ABSENT | COMPARATIVE EXAMPLE |
| 108 | 24 | 14 | ABSENT | ABSENT | ABSENT | COMPARATIVE EXAMPLE |

Thereafter, of each of the steel sheets, an area fraction $f_F$ of ferrite, an area fraction $f_M$ of martensite, an area fraction $f_{GB}$ of granular bainite, an area fraction $f_B$ of bainite, an area fraction $f_P$ of pearlite, and an area fraction $f_{R-\gamma}$ of retained austenite were measured. Results are illustrated in Table 8 to Table 12. Each underline in Table 8 to Table 12 regarding these results indicates that a corresponding numerical value is out of the range of the present invention.

Then, a tensile test, a hole expansion test, and a bending test of each of the steel sheets were performed. In the tensile test, a Japan Industrial Standard JIS No. 5 test piece was taken perpendicularly to the rolling direction from the steel sheet, of which a tensile strength TS and total elongation EL were measured in conformity with JISZ2242. In the hole expansion test, a hole expansion ratio $\lambda$ was measured in accordance with the description of JISZ2256. In the bending test, a test in conformity with the stipulation of Standard 238-100 of Verband der Automobilindustrie (VDA) was performed and a VDA bending angle $\alpha$ was measured. These results are also illustrated in Table 8 to Table 12. Each underline in Table 8 to Table 12 regarding these results indicates that a corresponding numerical value is out of a desired range. The desired range to be described here means that TS is 1180 MPa or more, EL is 10% or more, $\lambda$ is 20% or more, and the VDA bending angle $\alpha$ is equal to or more than a reference value $\alpha_0$ ($\alpha_0 = 7.69t^2 - 38.4t + 109$ when a thickness is set to t (mm)).

TABLE 8

| SAMPLE No. | SYMBOL OF STEEL | METAL STRUCTURE (%) | | | | | | | THICKNESS (mm) | MECHANICAL PROPERTIES | | | | | NOTE |
|---|---|---|---|---|---|---|---|---|---|---|---|---|---|---|---|
| | | $f_F$ (%) | $f_M$ (%) | $f_{GB}$ (%) | $f_B$ (%) | $f_P$ (%) | $f_{R-\gamma}$ (%) | $f_P + f_{R-\gamma}$ (%) | | TS (MPa) | EL (%) | $\lambda$ (%) | $\alpha_O$ (°) | $\alpha$ (°) | |
| 1 | A | 34 | 34 | 18 | 8 | 0 | 6 | 6 | 1.80 | 1236 | 12 | 31 | 65 | 89 | EXAMPLE |
| 2 | A | 31 | 38 | 12 | 13 | 0 | 6 | 6 | 1.38 | 1280 | 10 | 44 | 71 | 89 | EXAMPLE |
| 3 | A | 42 | 31 | 13 | 14 | 0 | 0 | 0 | 1.20 | 1181 | 13 | 38 | 74 | 81 | EXAMPLE |
| 4 | A | 34 | 34 | 14 | 12 | 0 | 6 | 6 | 1.26 | 1234 | 10 | 33 | 73 | 93 | EXAMPLE |
| 5 | B | 34 | 32 | 15 | 11 | 0 | 8 | 8 | 1.68 | 1194 | 11 | 53 | 66 | 100 | EXAMPLE |
| 6 | B | 39 | 31 | 13 | 12 | 0 | 5 | 5 | 1.32 | 1181 | 12 | 23 | 72 | 77 | EXAMPLE |
| 7 | B | 35 | 35 | 15 | 11 | 0 | 4 | 4 | 1.17 | 1182 | 11 | 53 | 75 | 85 | EXAMPLE |
| 8 | B | 34 | 35 | 12 | 14 | 0 | 5 | 5 | 1.17 | 1191 | 11 | 27 | 75 | 95 | EXAMPLE |
| 9 | C | 35 | 38 | 12 | 13 | 0 | 2 | 2 | 1.44 | 1212 | 11 | 27 | 70 | 79 | EXAMPLE |
| 10 | C | 30 | 35 | 13 | 18 | 0 | 4 | 4 | 1.50 | 1216 | 10 | 44 | 69 | 89 | EXAMPLE |
| 11 | C | 40 | 40 | 13 | 5 | 0 | 2 | 2 | 1.47 | 1211 | 12 | 44 | 69 | 86 | EXAMPLE |
| 12 | C | 43 | 33 | 14 | 9 | 0 | 1 | 1 | 1.38 | 1181 | 13 | 20 | 71 | 86 | EXAMPLE |
| 13 | D | 42 | 33 | 13 | 8 | 0 | 4 | 4 | 1.95 | 1182 | 13 | 20 | 63 | 83 | EXAMPLE |
| 14 | D | 40 | 32 | 12 | 12 | 0 | 4 | 4 | 0.96 | 1186 | 12 | 31 | 79 | 87 | EXAMPLE |
| 15 | D | 44 | 32 | 12 | 8 | 0 | 4 | 4 | 1.29 | 1182 | 13 | 26 | 72 | 75 | EXAMPLE |
| 16 | D | 34 | 35 | 12 | 14 | 0 | 5 | 5 | 1.41 | 1208 | 11 | 27 | 70 | 72 | EXAMPLE |
| 17 | E | 45 | 32 | 12 | 11 | 0 | 0 | 0 | 0.96 | 1182 | 15 | 21 | 79 | 81 | EXAMPLE |
| 18 | E | 30 | 41 | 18 | 11 | 0 | 0 | 0 | 1.53 | 1247 | 10 | 59 | 68 | 91 | EXAMPLE |
| 19 | E | 40 | 33 | 14 | 13 | 0 | 0 | 0 | 1.44 | 1195 | 12 | 23 | 70 | 87 | EXAMPLE |
| 20 | E | 31 | 46 | 10 | 13 | 0 | 0 | 0 | 1.50 | 1287 | 10 | 33 | 69 | 97 | EXAMPLE |
| 21 | F | 46 | 33 | 10 | 11 | 0 | 0 | 0 | 0.96 | 1183 | 14 | 33 | 79 | 94 | EXAMPLE |
| 22 | F | 32 | 44 | 10 | 14 | 0 | 0 | 0 | 1.29 | 1268 | 11 | 37 | 72 | 92 | EXAMPLE |
| 23 | F | 32 | 37 | 16 | 15 | 0 | 0 | 0 | 1.44 | 1209 | 11 | 27 | 70 | 83 | EXAMPLE |
| 24 | F | 39 | 36 | 11 | 14 | 0 | 0 | 0 | 1.14 | 1194 | 12 | 45 | 75 | 100 | EXAMPLE |

TABLE 9

| SAMPLE No. | SYMBOL OF STEEL | METAL STRUCTURE (%) | | | | | | | THICKNESS (mm) | MECHANICAL PROPERTIES | | | | | NOTE |
|---|---|---|---|---|---|---|---|---|---|---|---|---|---|---|---|
| | | $f_F$ (%) | $f_M$ (%) | $f_{GB}$ (%) | $f_B$ (%) | $f_P$ (%) | $f_{R-\gamma}$ (%) | $f_P + f_{R-\gamma}$ (%) | | TS (MPa) | EL (%) | $\lambda$ (%) | $\alpha_O$ (°) | $\alpha$ (°) | |
| 25 | G | 36 | 45 | 10 | 9 | 0 | 0 | 0 | 1.26 | 1216 | 12 | 31 | 73 | 78 | EXAMPLE |
| 26 | G | 37 | 40 | 15 | 8 | 0 | 0 | 0 | 1.62 | 1185 | 12 | 44 | 67 | 101 | EXAMPLE |
| 27 | G | 33 | 46 | 10 | 11 | 0 | 0 | 0 | 1.38 | 1240 | 11 | 27 | 71 | 84 | EXAMPLE |
| 28 | G | 32 | 45 | 12 | 11 | 0 | 0 | 0 | 1.35 | 1232 | 11 | 53 | 71 | 102 | EXAMPLE |
| 29 | G | 32 | 45 | 14 | 9 | 0 | 0 | 0 | 1.17 | 1214 | 11 | 28 | 75 | 75 | EXAMPLE |
| 30 | H | 33 | 44 | 12 | 11 | 0 | 0 | 0 | 1.20 | 1194 | 11 | 37 | 74 | 82 | EXAMPLE |
| 31 | H | 32 | 45 | 14 | 9 | 0 | 0 | 0 | 1.02 | 1203 | 11 | 27 | 78 | 78 | EXAMPLE |
| 32 | H | 33 | 43 | 10 | 14 | 0 | 0 | 0 | 1.71 | 1196 | 11 | 53 | 66 | 103 | EXAMPLE |
| 33 | H | 31 | 47 | 9 | 13 | 0 | 0 | 0 | 1.17 | 1225 | 11 | 51 | 75 | 104 | EXAMPLE |
| 34 | H | 32 | 45 | 9 | 14 | 0 | 0 | 0 | 1.41 | 1211 | 12 | 27 | 70 | 82 | EXAMPLE |
| 35 | H | 31 | 42 | 14 | 13 | 0 | 0 | 0 | 1.50 | 1185 | 11 | 37 | 69 | 90 | EXAMPLE |
| 36 | I | 33 | 40 | 19 | 8 | 0 | 0 | 0 | 0.99 | 1192 | 11 | 53 | 79 | 89 | EXAMPLE |
| 37 | I | 30 | 43 | 18 | 9 | 0 | 0 | 0 | 1.05 | 1210 | 10 | 33 | 77 | 92 | EXAMPLE |
| 38 | I | 31 | 43 | 12 | 14 | 0 | 0 | 0 | 1.41 | 1218 | 11 | 27 | 70 | 72 | EXAMPLE |
| 39 | I | 32 | 42 | 14 | 12 | 0 | 0 | 0 | 1.65 | 1205 | 11 | 27 | 67 | 92 | EXAMPLE |
| 40 | I | 33 | 39 | 19 | 9 | 0 | 0 | 0 | 1.05 | 1182 | 10 | 46 | 77 | 90 | EXAMPLE |
| 41 | I | 33 | 41 | 19 | 7 | 0 | 0 | 0 | 1.41 | 1188 | 11 | 37 | 70 | 83 | EXAMPLE |
| 42 | J | 34 | 39 | 18 | 9 | 0 | 0 | 0 | 0.99 | 1199 | 11 | 27 | 79 | 79 | EXAMPLE |
| 43 | J | 32 | 41 | 18 | 9 | 0 | 0 | 0 | 1.05 | 1212 | 11 | 28 | 77 | 80 | EXAMPLE |
| 44 | J | 35 | 41 | 15 | 9 | 0 | 0 | 0 | 1.41 | 1217 | 11 | 35 | 70 | 94 | EXAMPLE |
| 45 | J | 32 | 39 | 13 | 16 | 0 | 0 | 0 | 1.65 | 1214 | 11 | 34 | 67 | 94 | EXAMPLE |

TABLE 9-continued

| SAMPLE No. | SYMBOL OF STEEL | METAL STRUCTURE (%) | | | | | | | MECHANICAL PROPERTIES | | | | | NOTE |
|---|---|---|---|---|---|---|---|---|---|---|---|---|---|---|
| | | $f_F$ (%) | $f_M$ (%) | $f_{GB}$ (%) | $f_B$ (%) | $f_P$ (%) | $f_{R-\gamma}$ (%) | $f_P + f_{R-\gamma}$ (%) | THICKNESS (mm) | TS (MPa) | EL (%) | λ (%) | $\alpha_O$ (°) | α (°) | |
| 46 | J | 33 | 40 | 17 | 10 | 0 | 0 | 0 | 1.29 | 1223 | 11 | 27 | 72 | 82 | EXAMPLE |
| 47 | J | 32 | 38 | 13 | 17 | 0 | 0 | 0 | 1.44 | 1210 | 11 | 54 | 70 | 91 | EXAMPLE |

TABLE 10

| SAMPLE No. | SYMBOL OF STEEL | METAL STRUCTURE (%) | | | | | | | MECHANICAL PROPERTIES | | | | | NOTE |
|---|---|---|---|---|---|---|---|---|---|---|---|---|---|---|
| | | $f_F$ (%) | $f_M$ (%) | $f_{GB}$ (%) | $f_B$ (%) | $f_P$ (%) | $f_{R-\gamma}$ (%) | $f_P + f_{R-\gamma}$ (%) | THICKNESS (mm) | TS (MPa) | EL (%) | λ (%) | $\alpha_O$ (°) | α (°) | |
| 48 | K | 31 | 39 | 13 | 17 | 0 | 0 | 0 | 1.65 | 1193 | 11 | 38 | 67 | 86 | EXAMPLE |
| 49 | K | 34 | 42 | 14 | 10 | 0 | 0 | 0 | 1.50 | 1207 | 12 | 26 | 69 | 82 | EXAMPLE |
| 50 | K | 32 | 37 | 13 | 18 | 0 | 0 | 0 | 1.50 | 1182 | 11 | 38 | 69 | 83 | EXAMPLE |
| 51 | K | 32 | 36 | 13 | 19 | 0 | 0 | 0 | 1.05 | 1183 | 12 | 63 | 77 | 84 | EXAMPLE |
| 52 | K | 33 | 41 | 10 | 16 | 0 | 0 | 0 | 1.08 | 1200 | 11 | 53 | 76 | 104 | EXAMPLE |
| 53 | L | 33 | 40 | 18 | 9 | 0 | 0 | 0 | 1.08 | 1244 | 11 | 51 | 76 | 100 | EXAMPLE |
| 54 | M | 37 | 36 | 19 | 8 | 0 | 0 | 0 | 1.47 | 1180 | 12 | 32 | 69 | 89 | EXAMPLE |
| 55 | N | 40 | 34 | 13 | 13 | 0 | 0 | 0 | 1.05 | 1188 | 13 | 23 | 77 | 84 | EXAMPLE |
| 56 | O | 31 | 39 | 12 | 13 | 0 | 0 | 0 | 1.14 | 1216 | 12 | 24 | 75 | 74 | EXAMPLE |
| 57 | P | 33 | 39 | 12 | 16 | 0 | 0 | 0 | 1.11 | 1254 | 11 | 50 | 76 | 95 | EXAMPLE |
| 58 | Q | 39 | 38 | 11 | 12 | 0 | 0 | 0 | 1.29 | 1186 | 12 | 32 | 72 | 93 | EXAMPLE |
| 59 | R | 34 | 41 | 10 | 15 | 0 | 0 | 0 | 1.11 | 1220 | 11 | 53 | 76 | 92 | EXAMPLE |
| 60 | S | 32 | 39 | 13 | 16 | 0 | 0 | 0 | 1.32 | 1209 | 11 | 54 | 72 | 90 | EXAMPLE |
| 61 | T | 34 | 40 | 13 | 13 | 0 | 0 | 0 | 1.44 | 1213 | 12 | 45 | 70 | 99 | EXAMPLE |
| 62 | U | 34 | 40 | 18 | 8 | 0 | 0 | 0 | 1.05 | 1184 | 12 | 43 | 77 | 104 | EXAMPLE |
| 63 | V | 33 | 42 | 15 | 10 | 0 | 0 | 0 | 1.26 | 1223 | 11 | 37 | 73 | 93 | EXAMPLE |
| 64 | W | 34 | 41 | 14 | 11 | 0 | 0 | 0 | 1.17 | 1195 | 11 | 50 | 75 | 87 | EXAMPLE |
| 65 | X | 38 | 37 | 14 | 11 | 0 | 0 | 0 | 1.29 | 1188 | 13 | 28 | 72 | 83 | EXAMPLE |
| 66 | X | 35 | 39 | 12 | 14 | 0 | 0 | 0 | 1.20 | 1207 | 12 | 25 | 74 | 89 | EXAMPLE |
| 67 | Y | 31 | 37 | 14 | 18 | 0 | 0 | 0 | 1.38 | 1181 | 11 | 23 | 71 | 75 | EXAMPLE |
| 68 | Z | 39 | 38 | 12 | 11 | 0 | 0 | 0 | 1.26 | 1205 | 13 | 26 | 73 | 81 | EXAMPLE |

TABLE 11

| SAMPLE No. | SYMBOL OF STEEL | METAL STRUCTURE (%) | | | | | | | MECHANICAL PROPERTIES | | | | | NOTE |
|---|---|---|---|---|---|---|---|---|---|---|---|---|---|---|
| | | $f_F$ (%) | $f_M$ (%) | $f_{GB}$ (%) | $f_B$ (%) | $f_P$ (%) | $f_{R-\gamma}$ (%) | $f_P + f_{R-\gamma}$ (%) | THICKNESS (mm) | TS (MPa) | EL (%) | λ (%) | $\alpha_O$ (°) | α (°) | |
| 71 | a | 31 | 40 | 17 | 12 | 0 | 0 | 0 | 1.38 | <u>1078</u> | 12 | 31 | 71 | 93 | COMPARATIVE EXAMPLE |
| 72 | b | 36 | 32 | 10 | 14 | 8 | 0 | 8 | 1.23 | 1198 | 10 | <u>18</u> | 73 | <u>66</u> | COMPARATIVE EXAMPLE |
| 73 | c | 41 | 33 | 18 | 8 | 0 | 0 | 0 | 1.20 | <u>1086</u> | 11 | 34 | 74 | 104 | COMPARATIVE EXAMPLE |
| 74 | d | 36 | 31 | 14 | 19 | 0 | 0 | 0 | 1.47 | <u>1099</u> | 10 | 32 | 69 | 100 | COMPARATIVE EXAMPLE |
| 75 | e | <u>25</u> | <u>25</u> | 10 | <u>40</u> | 0 | 0 | 0 | 1.05 | <u>1096</u> | 13 | <u>18</u> | 77 | 82 | COMPARATIVE EXAMPLE |
| 76 | f | 31 | 45 | 12 | 12 | 0 | 0 | 0 | 1.50 | 1209 | 10 | <u>19</u> | 69 | <u>65</u> | COMPARATIVE EXAMPLE |
| 77 | g | 40 | 36 | 14 | 10 | 0 | 0 | 0 | 1.38 | <u>1119</u> | <u>9</u> | <u>17</u> | 71 | <u>58</u> | COMPARATIVE EXAMPLE |
| 78 | h | 43 | 33 | 13 | 11 | 0 | 0 | 0 | 1.11 | <u>1158</u> | 11 | <u>16</u> | 76 | <u>63</u> | COMPARATIVE EXAMPLE |
| 79 | i | 39 | 35 | 12 | 14 | 0 | 0 | 0 | 1.35 | <u>1152</u> | <u>8</u> | <u>17</u> | 71 | <u>70</u> | COMPARATIVE EXAMPLE |
| 80 | j | 39 | 35 | 9 | 17 | 0 | 0 | 0 | 1.20 | <u>1173</u> | <u>9</u> | <u>15</u> | 74 | <u>63</u> | COMPARATIVE EXAMPLE |
| 81 | k | 32 | 41 | 17 | 10 | 0 | 0 | 0 | 1.11 | 1259 | 10 | <u>17</u> | 76 | 76 | COMPARATIVE EXAMPLE |
| 82 | l | 34 | 41 | 9 | 16 | 0 | 0 | 0 | 1.23 | 1211 | 11 | <u>12</u> | 73 | <u>60</u> | COMPARATIVE EXAMPLE |
| 83 | m | 35 | 37 | 14 | 14 | 0 | 0 | 0 | 1.20 | 1239 | 10 | <u>16</u> | 74 | 75 | COMPARATIVE EXAMPLE |

TABLE 11-continued

| SAMPLE No. | SYMBOL OF STEEL | METAL STRUCTURE (%) | | | | | | | THICKNESS (mm) | MECHANICAL PROPERTIES | | | | | NOTE |
|---|---|---|---|---|---|---|---|---|---|---|---|---|---|---|---|
| | | $f_F$ (%) | $f_M$ (%) | $f_{GB}$ (%) | $f_B$ (%) | $f_P$ (%) | $f_{R-\gamma}$ (%) | $f_P + f_{R-\gamma}$ (%) | | TS (MPa) | EL (%) | λ (%) | $\alpha_O$ (°) | α (°) | |
| 84 | n | 39 | 48 | 6 | 7 | 0 | 0 | 0 | 1.50 | 1277 | 10 | 18 | 69 | 80 | COMPARATIVE EXAMPLE |
| 85 | o | 40 | 42 | 10 | 8 | 0 | 0 | 0 | 1.20 | 1185 | 11 | 17 | 74 | 72 | COMPARATIVE EXAMPLE |
| 86 | p | 45 | 30 | 16 | 9 | 0 | 0 | 0 | 1.20 | 1092 | 12 | 19 | 74 | 94 | COMPARATIVE EXAMPLE |
| 87 | q | 43 | 30 | 16 | 11 | 0 | 0 | 0 | 1.38 | 1119 | 11 | 14 | 71 | 75 | COMPARATIVE EXAMPLE |
| 88 | r | 39 | 38 | 11 | 12 | 0 | 0 | 0 | 1.05 | 1141 | 9 | 13 | 77 | 66 | COMPARATIVE EXAMPLE |
| 89 | s | 34 | 40 | 19 | 7 | 0 | 0 | 0 | 1.23 | 1204 | 10 | 13 | 73 | 57 | COMPARATIVE EXAMPLE |
| 90 | t | 37 | 38 | 12 | 13 | 0 | 0 | 0 | 1.38 | 1170 | 9 | 11 | 71 | 60 | COMPARATIVE EXAMPLE |
| 91 | u | 30 | 42 | 18 | 10 | 0 | 0 | 0 | 1.17 | 1245 | 9 | 14 | 75 | 67 | COMPARATIVE EXAMPLE |
| 92 | v | 37 | 34 | 16 | 13 | 0 | 0 | 0 | 1.14 | 1119 | 10 | 11 | 75 | 63 | COMPARATIVE EXAMPLE |
| 93 | w | 30 | 45 | 13 | 12 | 0 | 0 | 0 | 1.08 | 1218 | 8 | 15 | 76 | 62 | COMPARATIVE EXAMPLE |

TABLE 12

| SAMPLE No. | SYMBOL OF STEEL | METAL STRUCTURE (%) | | | | | | | THICKNESS (mm) | MECHANICAL PROPERTIES | | | | | NOTE |
|---|---|---|---|---|---|---|---|---|---|---|---|---|---|---|---|
| | | $f_F$ (%) | $f_M$ (%) | $f_{GB}$ (%) | $f_B$ (%) | $f_P$ (%) | $f_{R-\gamma}$ (%) | $f_P + f_{R-\gamma}$ (%) | | TS (MPa) | EL (%) | λ (%) | $\alpha_O$ (°) | α (°) | |
| 94 | x | HOT-ROLLED SHEET SHAPE IS DEFECTIVE | | | | | | | | | | | | | COMPARATIVE EXAMPLE |
| 95 | x | HOT-ROLLED SHEET SHAPE IS DEFECTIVE | | | | | | | | | | | | | COMPARATIVE EXAMPLE |
| 96 | x | COLD ROLLING IS IMPOSSIBLE | | | | | | | | | | | | | COMPARATIVE EXAMPLE |
| 97 | x | 32 | 31 | 10 | 27 | 0 | 0 | 0 | 1.17 | 1181 | 10 | 20 | 75 | 75 | EXAMPLE |
| 98 | x | COLD ROLLING IS IMPOSSIBLE | | | | | | | | | | | | | COMPARATIVE EXAMPLE |
| 99 | x | COLD ROLLING IS IMPOSSIBLE | | | | | | | | | | | | | COMPARATIVE EXAMPLE |
| 100 | x | 0 | 49 | 11 | 40 | 0 | 0 | 0 | 1.59 | 1341 | 8 | 45 | 67 | 74 | COMPARATIVE EXAMPLE |
| 101 | x | 82 | 0 | 0 | 0 | 18 | 0 | 18 | 1.59 | 551 | 22 | 13 | 67 | 71 | COMPARATIVE EXAMPLE |
| 102 | x | 52 | 26 | 2 | 4 | 16 | 0 | 16 | 1.59 | 937 | 15 | 14 | 67 | 66 | COMPARATIVE EXAMPLE |
| 103 | x | 42 | 34 | 1 | 3 | 20 | 0 | 20 | 1.59 | 1025 | 13 | 27 | 67 | 87 | COMPARATIVE EXAMPLE |
| 104 | x | 56 | 27 | 8 | 9 | 0 | 0 | 0 | 1.59 | 1069 | 16 | 25 | 67 | 71 | COMPARATIVE EXAMPLE |
| 105 | x | 28 | 32 | 21 | 7 | 12 | 0 | 12 | 1.59 | 1051 | 11 | 35 | 67 | 65 | COMPARATIVE EXAMPLE |
| 106 | x | 44 | 25 | 17 | 8 | 6 | 0 | 6 | 1.59 | 1017 | 13 | 18 | 67 | 62 | COMPARATIVE EXAMPLE |
| 107 | x | 43 | 16 | 1 | 40 | 0 | 0 | 0 | 1.59 | 1027 | 13 | 26 | 67 | 65 | COMPARATIVE EXAMPLE |
| 108 | x | 48 | 12 | 0 | 40 | 0 | 0 | 0 | 1.59 | 1002 | 15 | 17 | 67 | 62 | COMPARATIVE EXAMPLE |

As illustrated in Table 8 to Table 10, it was possible to obtain a high strength and excellent elongation and hole expandability in each of samples falling within the present invention range.

In Sample No. 71, the C content was too low, and thus the tensile strength was low. In Sample No. 72, the C content was too high, and thus the hole expansion ratio was low. In Sample No. 73, the Si content was too low, and thus the tensile strength was low. In Sample No. 74, the Si content was too high, and thus the tensile strength was low. In Sample No. 75, the Mn content was too low, and thus the tensile strength and the hole expansion ratio were low. In Sample No. 76, the Mn content was too high, and thus the hole expansion ratio and the VDA bending angle were low. In Sample No. 77, the P content was too high, and thus the tensile strength, the elongation, the hole expansion ratio, and the VDA bending angle were low. In Sample No. 78, the S content was too high, and thus the tensile strength and the hole expansion ratio were low. In Sample No. 79, the Al content was too low, and thus the tensile strength, the elongation, and the hole expansion ratio were low. In Sample No. 80, the Al content was too high, and thus the tensile strength, the elongation, the hole expansion ratio, and the VDA bending angle were low. In Sample No. 81, the N content was too high, and thus the hole expansion ratio was low. In Sample No. 82, the O content was too high, and thus the hole expansion ratio and the VDA bending angle were low.

In Sample No. 83, the Cr content was too high, and thus the hole expansion ratio was low. In Sample No. 84, the Mo content was too high, and thus the hole expansion ratio was low. In Sample No. 85, the Ni content was too high, and thus the hole expansion ratio was low. In Sample No. 86, the Cu content was too high, and thus the tensile strength and the hole expansion ratio were low. In Sample No. 87, the Nb content was too high, and thus the tensile strength and the hole expansion ratio were low. In Sample No. 88, the Ti content was too high, and thus the tensile strength, the elongation, the hole expansion ratio, and the VDA bending angle were low. In Sample No. 89, the V content was too high, and thus the hole expansion ratio and the VDA bending angle were low. In Sample No. 90, the B content was too high, and thus the tensile strength, the elongation, the hole expansion ratio, and the VDA bending angle were low. In Sample No. 91, the Ca content was too high, and thus the elongation, the hole expansion ratio, and the VDA bending angle were low. In Sample No. 92, the Mg content was too high, and thus the tensile strength, the hole expansion ratio, and the VDA bending angle were low. In Sample No. 93, the REM content was too high, and thus the elongation, the hole expansion ratio, and the VDA bending angle were low.

In Sample No. 94, the slab heating temperature was too low and cracking occurred during hot rolling, failing to perform sheet passing to be performed thereafter. In Sample No. 95, the finishing temperature of the finish rolling was too low, and thus the shape became worse in the middle of hot rolling, failing to perform sheet passing to be performed thereafter. In Sample No. 96, the coiling temperature was too low, and thus the hot-rolled steel sheet became hard excessively, failing to perform cold rolling thereafter. In Sample No. 97, the coiling temperature was too high and the area fraction of the martensite became short, and thus the elongation, the hole expansion ratio, and the VDA bending angle were low. In Sample No. 98, the reduction ratio of the cold rolling was too low, and thus the shape became worse in the middle of cold rolling, failing to perform sheet passing to be performed thereafter. In Sample No. 99, the reduction ratio of the cold rolling was too high, and thus the rolling load became large excessively, failing to perform sheet passing to be performed thereafter. In Sample No. 100, the maximum heating temperature of the annealing was too high, the area fraction of the ferrite became short, and the area fraction of the bainite was excessive, and thus the elongation was low. In Sample No. 101, the maximum heating temperature of the annealing was too low, the area fractions of the ferrite and the pearlite were excessive, and the area fractions of the martensite and the granular bainite became short, and thus the tensile strength and the hole expansion ratio were low. In Sample No. 102, the retention time at the maximum heating temperature was too short, the area fractions of the ferrite and the pearlite were excessive, and the area fractions of the martensite and the granular bainite became short, and thus the tensile strength, the hole expansion ratio, and the VDA bending angle were low. In Sample No. 103, the retention time at the maximum heating temperature was too short, the area fraction of the pearlite was excessive, and the area fraction of the granular bainite became short, and thus the tensile strength was low. In Sample No. 104, the first average cooling rate was too low, the area fraction of the ferrite was excessive, and the area fraction of the martensite became short, and thus the tensile strength was low. In Sample No. 105, the first average cooling rate was too high, the area fraction of the ferrite became short, and the area fractions of the granular bainite and the pearlite were excessive, and thus the tensile strength and the VDA bending angle were low. In Sample No. 106, the second average cooling rate was too low and the area fraction of the martensite became short, and thus the tensile strength, the hole expansion ratio, and the VDA bending angle were low. In Sample No. 107, the second average cooling rate was too low, the area fractions of the martensite and the granular bainite became short, and the area fraction of the bainite was excessive, and thus the tensile strength and the VDA bending angle were low. In Sample No. 108, the second average cooling rate was too high, the area fractions of the martensite and the granular bainite became short, and the area fraction of the bainite was excessive, and thus the tensile strength, the hole expansion ratio, and the VDA bending angle were low.

INDUSTRIAL APPLICABILITY

The present invention can be utilized in, for example, industries relating to a steel sheet suitable for automotive parts.

The invention claimed is:
1. A cold-rolled steel sheet comprising:
a chemical composition represented by, in mass %,
C: 0.09% to 0.15%,
Si: 0.2% to 2.5%,
Al: 0.01% to 1.00%,
Mn: 1.0% to 3.0%,
P: 0.02% or less,
S: 0.01% or less,
N: 0.007% or less,
O: 0.006% or less,
Cr: 0.00% to 1.00%,
Mo: 0.00% to 1.00%,
B: 0.0000% to 0.010%,
Nb: 0.000% to 0.30%,
Ti: 0.000% to 0.30%,
Ni: 0.00% to 1.00%,
Cu: 0.00% to 1.00%,
V: 0.000% to 0.50%,
Mg: 0.0000% to 0.04%,
REM: 0.0000% to 0.04%, and
the balance: Fe and impurities; and
a metal structure represented by, in area fraction,
ferrite: 30% to 50%,
granular bainite: 5% to 20%,
martensite: 30% to 55%,
bainite: less than 35%, and
retained austenite and pearlite: 10% or less in total,
wherein
a tensile strength is 1180 MPa or more.
2. The cold-rolled steel sheet according to claim 1, wherein
elongation is 10% or more, and
a hole expansion value is 20% or more.
3. The cold-rolled steel sheet according to claim 1, wherein
a VDA bending angle in the case where a thickness is set to t (mm) is "$7.69t^2-38.4t+109$" or more.

4. The cold-rolled steel sheet according to claim 2, wherein
a VDA bending angle in the case where a thickness is set to t (mm) is "$7.69t^2-38.4t+109$" or more.

5. The cold-rolled steel sheet according to claim 1, further comprising:
a hot-dip galvanizing layer on a surface thereof.

6. The cold-rolled steel sheet according to claim 2, further comprising:
a hot-dip galvanizing layer on a surface thereof.

7. The cold-rolled steel sheet according to claim 3, further comprising:
a hot-dip galvanizing layer on a surface thereof.

8. The cold-rolled steel sheet according to claim 4, further comprising:
a hot-dip galvanizing layer on a surface thereof.

9. The cold-rolled steel sheet according to claim 1, further comprising:
an alloyed hot-dip galvanizing layer on a surface thereof.

10. The cold-rolled steel sheet according to claim 2, further comprising:
an alloyed hot-dip galvanizing layer on a surface thereof.

11. The cold-rolled steel sheet according to claim 3, further comprising:
an alloyed hot-dip galvanizing layer on a surface thereof.

12. The cold-rolled steel sheet according to claim 4, further comprising:
an alloyed hot-dip galvanizing layer on a surface thereof.

* * * * *